US006738421B1

(12) United States Patent
Ueno

(10) Patent No.: US 6,738,421 B1
(45) Date of Patent: May 18, 2004

(54) DIGITAL DATA TRANSMISSION METHOD, DIGITAL DATA TRANSMISSION DEVICE AND DIGITAL DATA RECEIVING DEVICE

(75) Inventor: Takafumi Ueno, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/147,233

(22) PCT Filed: Mar. 5, 1998

(86) PCT No.: PCT/JP98/00906

§ 371 (c)(1),
(2), (4) Date: Mar. 12, 1999

(87) PCT Pub. No.: WO98/39919

PCT Pub. Date: Sep. 11, 1998

(30) Foreign Application Priority Data

Mar. 5, 1997 (JP) .............................. 9-050154

(51) Int. Cl.[7] .............................................. H04N 7/12
(52) U.S. Cl. .............................. 375/240.01; 375/240.19
(58) Field of Search ...................... 725/54; 375/240.01, 375/240.26, 240.19; 382/240

(56) References Cited

U.S. PATENT DOCUMENTS 5,253,056 A * 10/1993 Puri et al. ................... 358/133
5,502,497 A    3/1996 Yamaashi et al.
5,515,106 A    5/1996 Chaney et al.
6,005,561 A * 12/1999 Hawkins et al. ............. 345/327
6,005,601 A * 12/1999 Ohkura et al. .................. 348/7
6,134,382 A * 10/2000 Mishima et al. ............... 386/68
6,147,714 A * 11/2000 Terasawa et al. ............. 348/564

FOREIGN PATENT DOCUMENTS

| EP | 0643535 | 3/1995 |
| JP | 5-64167 | 3/1993 |
| JP | 6284413 | 10/1994 |
| JP | 7212761 | 8/1995 |
| JP | 8-70451 | 3/1996 |

OTHER PUBLICATIONS

An English Language abstract of JP 7–212761.
Takeshi Kimura, et al., "Study on Application of MPEG Systems to ISDB (in Japanese)", Technical Report of the Television Engineers of Japan, vol. 18, No. 28, Mar. 1994.

* cited by examiner

Primary Examiner—Chris Kelley
Assistant Examiner—George A Bugg
(74) Attorney, Agent, or Firm—Greenblum & Bernstein, P.L.C.

(57) ABSTRACT

First digital data (4) obtained by encoding a low-resolution digital video signal at a low-resolution compression encoder (13) and second digital data (5) obtained by encoding a high-resolution digital video signal at a high-resolution compression encoder (16) are multiplexed and transmitted with information relating to programs wherein identification information for identifying both digital data (4, 5) is described, and at a receiving (22) side, the first and second digital data are identified on the basis of the identification information, and are reproduced by corresponding decoders (28, 30). Therefore, when image of different resolutions is transmitted by multiplexing, it is possible to reproduce data correctly at the receiving side, thereby increasing freedom in program composition.

32 Claims, 31 Drawing Sheets

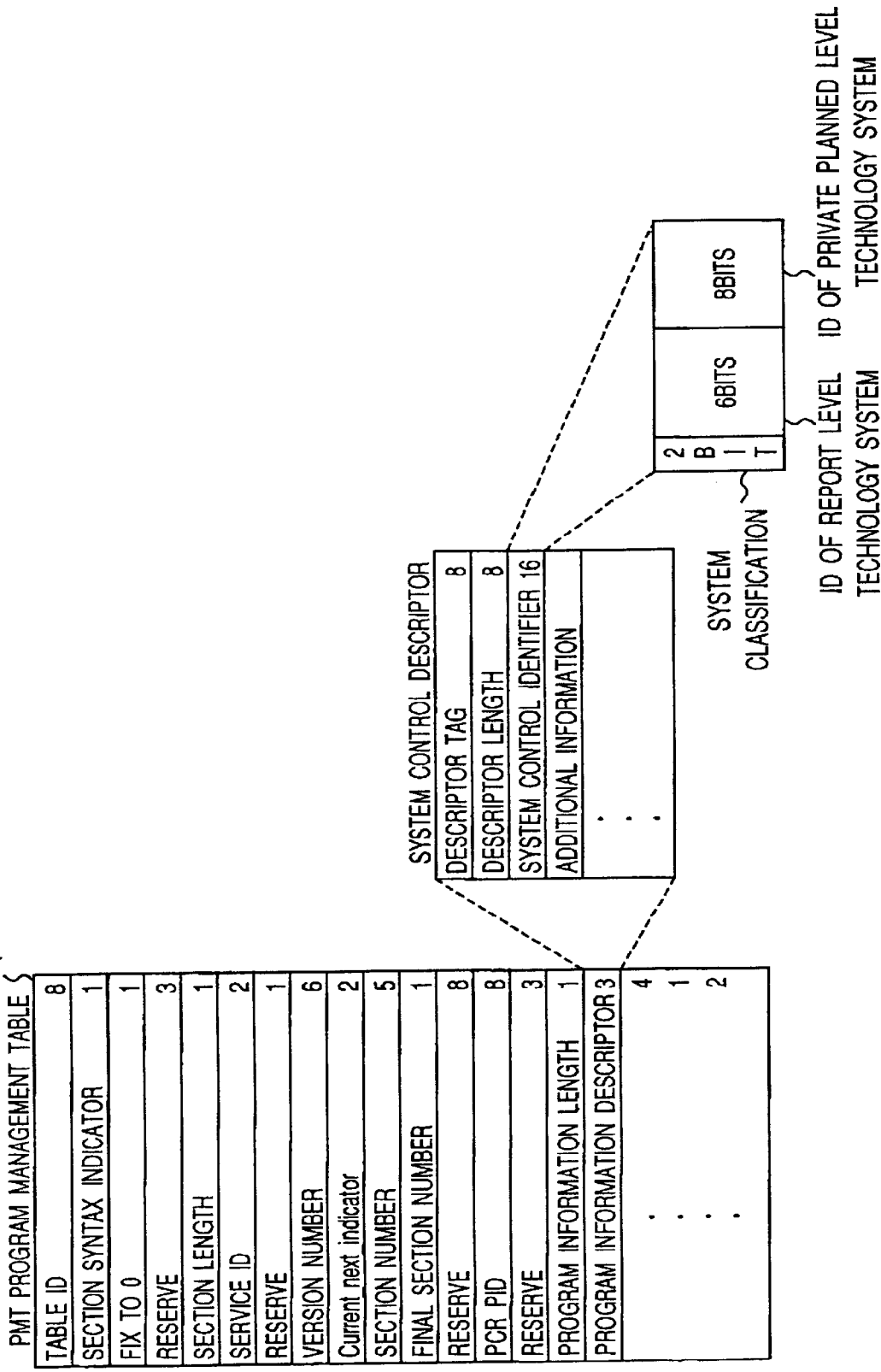

Fig.4

CODE ALLOCATIONS FOR LEAST SIGNIFICANT 8 BITS
OF SYSTEM CONTROL IDENTIFIER
(ID FOR PRIVATE LEVEL TECHNOLOGY SYSTEM)

| CODE | IMAGE TYPE |
|---|---|
| 0x01 | NON-HIERARCHICALLY ENCODED DATA |
| 0x02 | HIERARCHICALLY ENCODED DATA |

Fig.5

CODE ALLOCATIONS FOR MIDDLE 6 BITS
OF SYSTEM CONTROL IDENTIFIER
(ID FOR REPORT LEVEL TECHNOLOGY SYSTEM)

| CODE | MAGE TYPE |
|---|---|
| 0x01 | NON-HIERARCHICALLY ENCODED DATA |
| 0x02 | HIERARCHICALLY ENCODED DATA |

Fig.8

| PMT PROGRAM MANAGEMENT TABLE 202 |
|---|
| TABLE ID |
| SECTION SYNTAX INDICATOR |
| FIX TO 0 |
| RESERVE |
| SECTION LENGTH |
| SERVICE ID |
| RESERVE |
| VERSION NUMBER |
| Current_next_indicator |
| SECTION NUMBER |
| FINAL SECTION NUMBER |
| RESERVE |
| PCR PID |
| RESERVE |
| PROGRAM INFORMATION LENGTH |
| PROGRAM INFORMATION DESCRIPTOR |
| ... |

| STREAM IDENTIFIER |
|---|
| RESERVE |
| ELEMENTARY PID |
| ... |

| | STREAM TYPE |
|---|---|
| 0X00 | ITU-T ISO/IEC RESERVE |
| 0X01 | ISO/IEC 11172-2 VIDEO |
| 0X02 | ITU-T,Rec.H262 ISO/IEC 13818-2 OR ISO/IEC 11172-2 |
| 0X03 | ISO/IEC 11172-3 AUDIO |
| 0X04 | ISO/IEC 13818-3 AUDIO |
| 0X05 | ITU-T,rec.H.222.0 ISO/IEC 13818-1 PRIVATE SECTION |
| 0X06 | PES PACKET CONTAINING ITU-T,Rec.H.222.0 ISO/IEC 13818-1 PRIVATE DATA |
| 0X07 | ISO/IEC 13522 MHEG |
| 0X08 | ANNEXE A DSMCC |
| 0X09 | ITU-T,Rec.H.222.1 |
| 0X0A | ISO/IEC,13818-6 TYPE A |
| 0X0B | ISO/IEC,13818-6 TYPE B |
| 0X0C | ISO/IEC,13818-6 TYPE C |
| 0X0D | ISO/IEC,13818-6 TYPE D |
| 0X0E | ISO/IEC,13818-1 SUPPLEMENTARY DATA |
| 0X0F-0X0F | ITU-T,Rec.H.222.0 ISO/IEC 13818-1 RESERVE |
| 0X80 | FIRST DIGITAL DATA |
| 0X81 | SECOND DIGITAL DATA |
| 0X82-0XFF | USER PRIVATE |

Fig.11
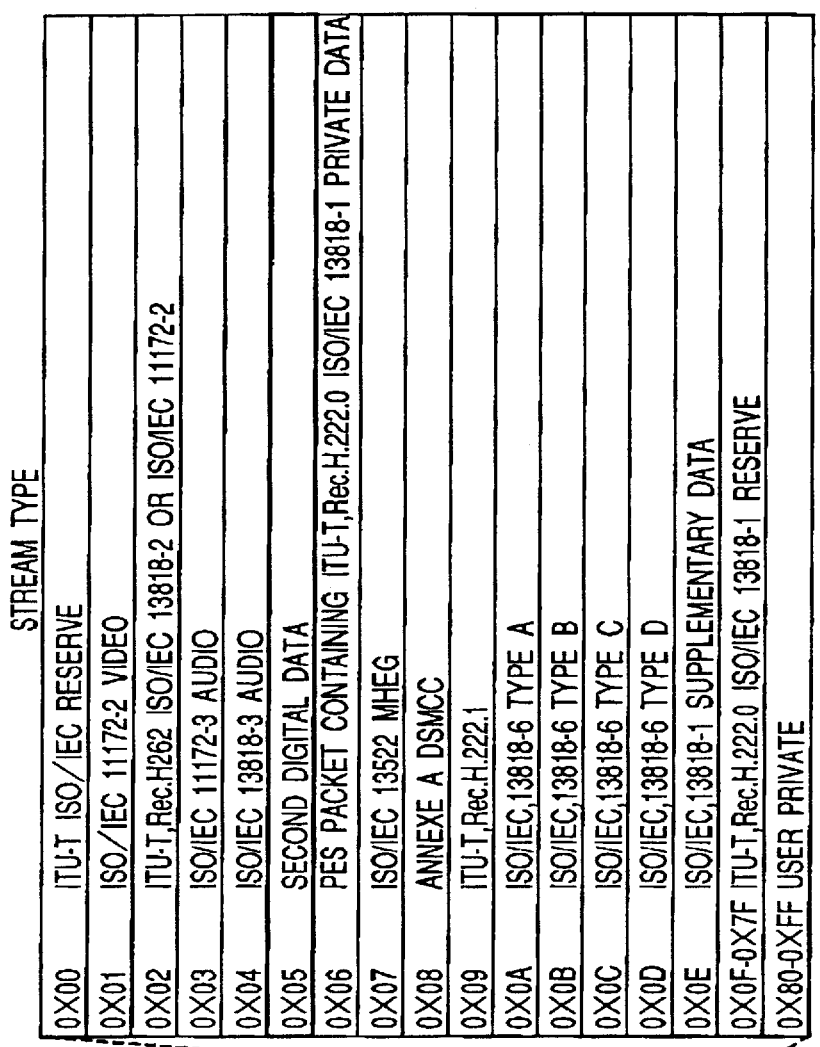
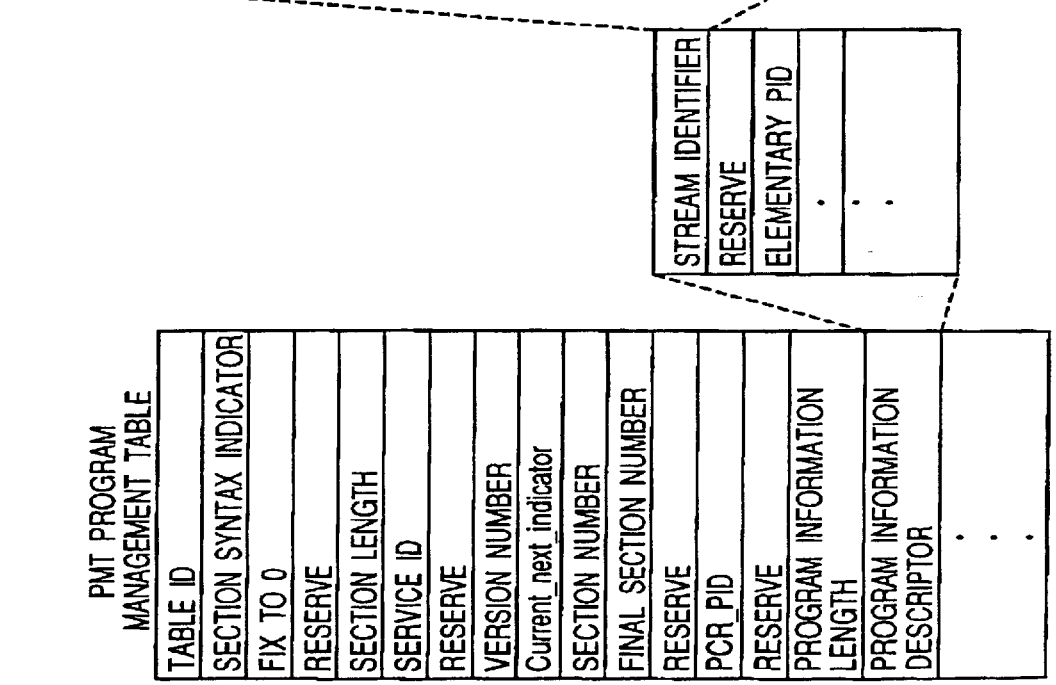

Fig.12

| | STREAM TYPE |
|---|---|
| 0X00 | ITU-T ISO/IEC RESERVE |
| 0X01 | ISO/IEC 11172-2 VIDEO |
| 0X02 | ITU-T,Rec.H262 ISO/IEC 13818-2 OR ISO/IEC 11172-2 |
| 0X03 | ISO/IEC 11172-3 AUDIO |
| 0X04 | ISO/IEC 13818-3 AUDIO |
| 0X05 | ITU-T,rec.H.222.0 ISO/IEC 13818-1 PRIVATE SECTION |
| 0X06 | PES PACKET CONTAINING ITU-T,Rec.H.222.0 ISO/IEC 13818-1 PRIVATE DATA |
| 0X07 | ISO/IEC 13522 MHEG |
| 0X08 | ANNEXE A DSMCC |
| 0X09 | ITU-T,Rec.H.222.1 |
| 0X0A | ISO/IEC,13818-6 TYPE A |
| 0X0B | ISO/IEC,13818-6 TYPE B |
| 0X0C | ISO/IEC,13818-6 TYPE C |
| 0X0D | ISO/IEC,13818-6 TYPE D |
| 0X0E | ISO/IEC,13818-1 SUPPLEMENTARY DATA |
| 0X0F | SECOND DIGITAL DATA |
| 0X10-0X7F | ITU-T,Rec.H.222.0 ISO/IEC 13818-1 RESERVE |
| 0X80-0XFF | USER PRIVATE |

STREAM IDENTIFIER | RESERVE | ELEMENTARY PID | ...

PMT PROGRAM MANAGEMENT TABLE
- TABLE ID
- SECTION SYNTAX INDICATOR
- FIX TO 0
- RESERVE
- SECTION LENGTH
- SERVICE ID
- RESERVE
- VERSION NUMBER
- Current_next_indicator
- SECTION NUMBER
- FINAL SECTION NUMBER
- RESERVE
- PCR PID
- RESERVE
- PROGRAM INFORMATION LENGTH
- PROGRAM INFORMATION DESCRIPTOR
- ...

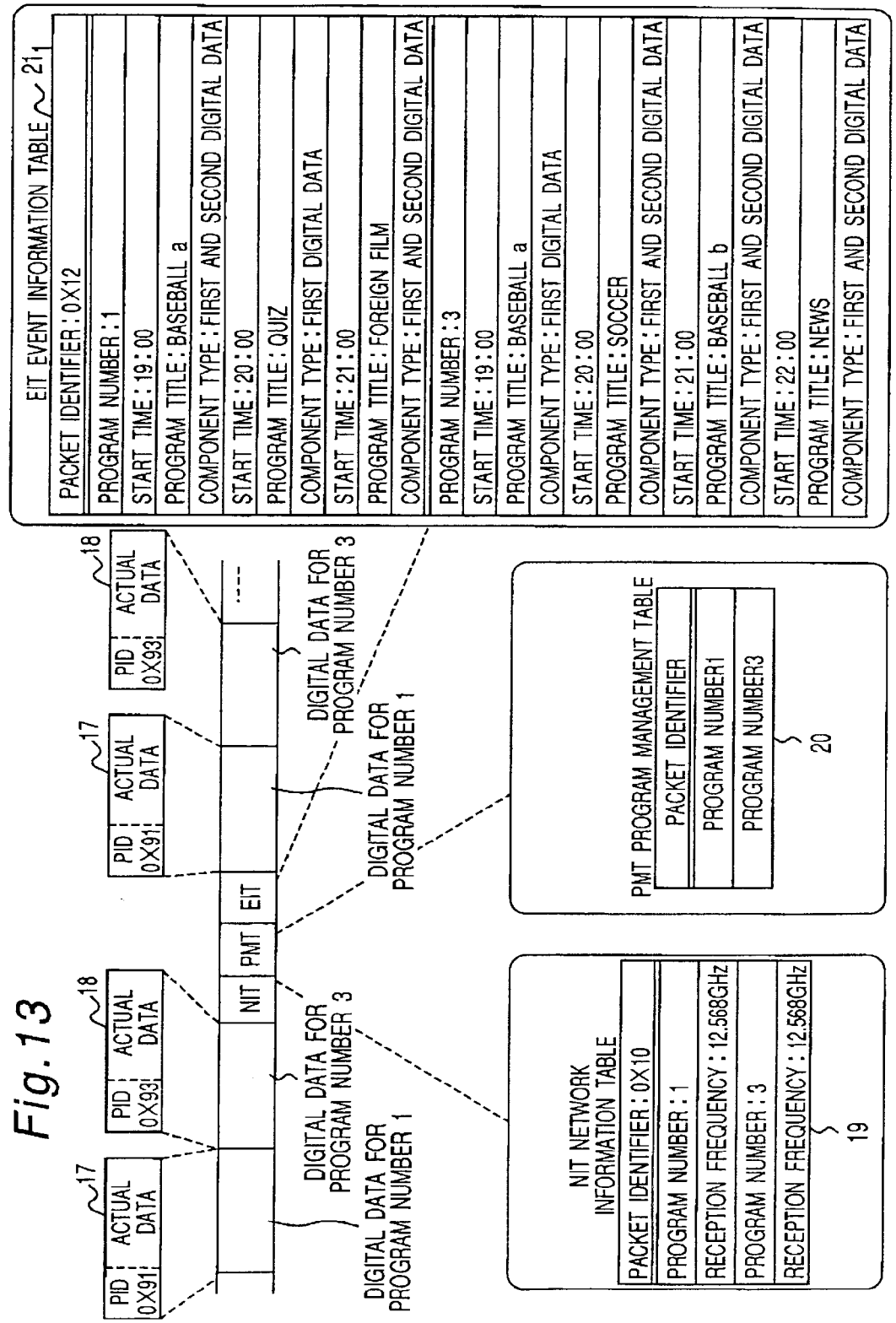

Fig.14

EIT EVENT INFORMATION TABLE $21_1$

| TABLE ID | 8 |
|---|---|
| SECTION SYNTAX INDICATOR | 1 |
| RESERVE | 3 |
| SECTION LENGTH | 1 |
| SERVICE ID | 2 |
| RESERVE | 1 |
| VERSION NUMBER | 6 |
| Current_next_indicator | 2 |
| SECTION NUMBER | 5 |
| FINAL SECTION NUMBER | 1 |
| TRANSPORT STREAM ID | 8 |
| ORIGINAL NETWORK | 8 |
| SEGMENT FINAL SECTION NUMBER | 1 |
| DESCRIPTOR | 6 |
| ⋮ | 1 |
| ⋮ | 6 |
| ⋮ | 8 |

| EVENT ID | 1 |
|---|---|
| START TIME | 6 |
| BROADCAST TIME | 4 |
| STATUS | 0 |
| FREE OR CHARGE OR WITH CHARGE | 2 |
| DESCRIPTOR LENGTH | 4 |
| DESCRIPTOR | 3 |
| ⋮ | 1 |
| ⋮ | 1 |
| ⋮ | 2 |

COMPONENT IDENTIFIER

| DESCRIPTOR TAG | 8 |
|---|---|
| DESCRIPTOR LENGTH | 8 |
| RESERVE | 4 |
| STREAM CONTENT | 4 |
| COMPONENT TYPE | 8 |
| COMPONENT TAG | 8 |
| LOGIC CELL ID | 6 |
| RESERVE | 1 |
| ADDITIONAL CHARGE | 1 |
| EXPLANATION | |

Fig.15

COMPONENT TYPE CODE ALLOCATION (FOR SECOND DIGITAL DATA)

| CODE | DATA TYPE |
|---|---|
| 0X21 | SECOND DIGITAL DATA (VIDEO) ; ASPECT RATIO 4 : 3 |
| 0X22 | SECOND DIGITAL DATA (VIDEO) ; ASPECT RATIO 16 : 9, WITH PAN VECTOR |
| 0X23 | SECOND DIGITAL DATA (VIDEO) ; ASPECT RATIO 16 : 9, WITHOUT PAN VECTOR |
| 0X24 | SECOND DIGITAL DATA (VIDEO) ; LETTER BOX |

Fig.16

COMPONENT TYPE CODE ALLOCATION (FOR FIRST DIGITAL DATA)

| CODE | IMAGE TYPE |
|---|---|
| 0x01 | FIRST DIGITAL DATA (VIDEO) ; ASPECT RATIO 4:3 |
| 0x02 | FIRST DIGITAL DATA (VIDEO) ; ASPECT RATIO 16:9 , WITH PAN VECTOR |
| 0x03 | FIRST DIGITAL DATA (VIDEO) ; ASPECT RATIO 16:9 , WITHOUT PAN VECTOR |
| 0x04 | FIRST DIGITAL DATA (VIDEO) ; LETTER BOX |

Fig.20

NIT NETWORK INFORMATION TABLE 19₁

| | |
|---|---|
| TABLE ID | 8 |
| SECTION SYNTAX INDICATOR | 1 |
| RESERVE | 3 |
| SECTION LENGTH | 1 |
| NETWORK ID | 2 |
| RESERVE | 1 |
| VERSION NUMBER | 6 |
| Current_next_indicator | 2 |
| SECTION NUMBER | 5 |
| FINAL SECTION NUMBER | 1 |
| RESERVE | 8 |
| DESCRIPTOR LENGTH | 8 |
| DESCRIPTOR | 4 |
| . | 1 |
| . | 2 |

Fig.21

CODE ALLOCATIONS FOR NETWORK ID

| CODE | DATA TYPE |
|---|---|
| 0x0001 | NON-HIERARCHICALLY ENCODED DATA |
| 0x0002 | HIERARCHICALLY ENCODED DATA |

*Fig.23*

CODE ALLOCATIONS FOR LEAST SIGNIFICANT 8 BITS OF SYSTEM CONTROL IDENTIFIER

| CODE | IMAGE TYPE |
|---|---|
| 0x03 | FIRST DECODING PROGRAM |
| 0x04 | SECOND DECODING PROGRAM |

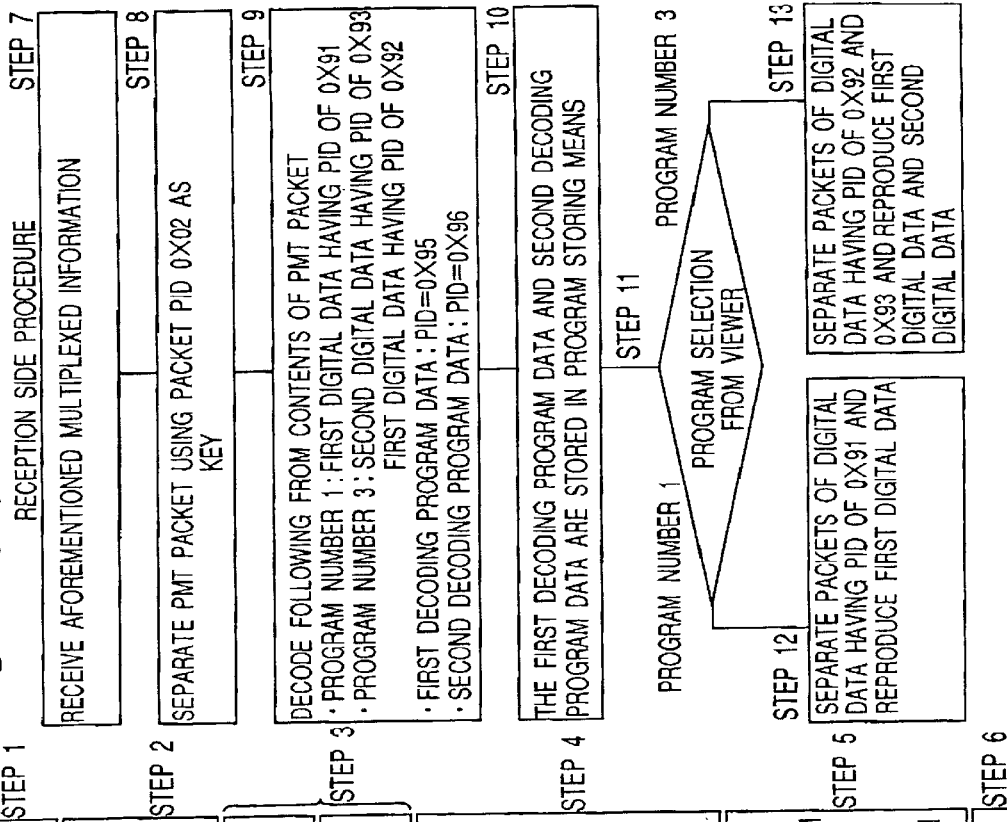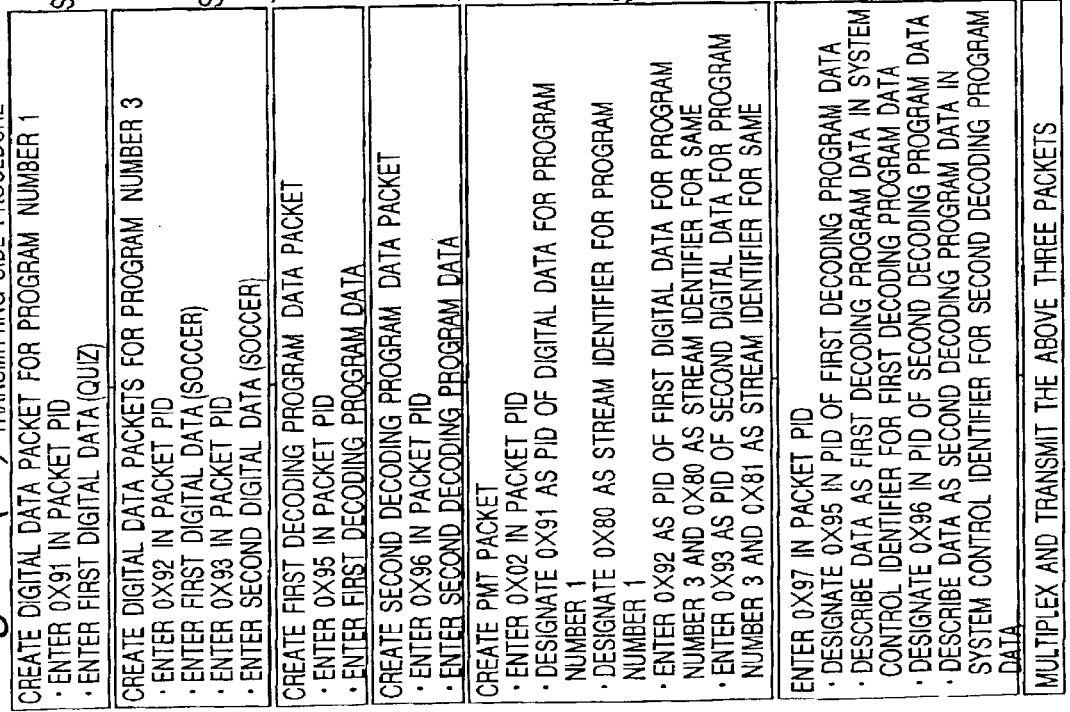

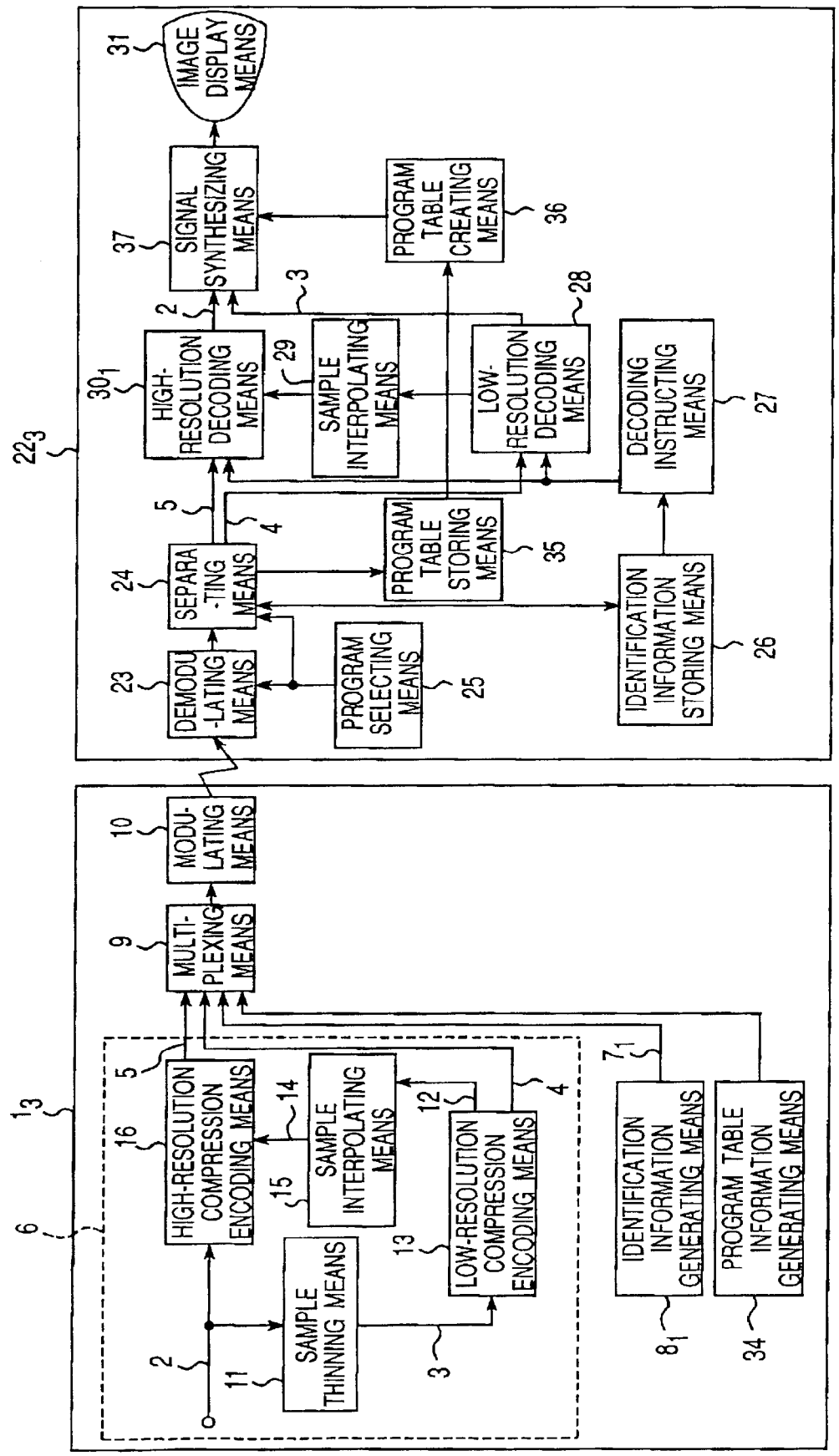

Fig.27(A)

PROGRAM TABLE FOR HIGH-RESOLUTION DIGITAL VIDEO SIGNAL
(1280 HORIZONTAL PIXELS×720 VERTICAL PIXELS; 59.94 FRAMES SEQUENTIAL SCANNING)

| TIME | PROGRAM | |
|---|---|---|
| | 1 | 3 |
| 19:00–20:00 | BASEBALL a | |
| 20:00–21:00 | FOREIGN FILM | SOCCER |
| 21:00–22:00 | | BASEBALL b |
| 22:00–23:00 | | NEWS |

Fig.27(B)

PROGRAM TABLE FOR LOW-RESOLUTION DIGITAL VIDEO SIGNAL
(704 HORIZONTAL PIXELS×480 VERTICAL PIXELS; 59.94 FRAMES SEQUENTIAL SCANNING)

| TIME | PROGRAM | |
|---|---|---|
| | 1 | 3 |
| 19:00–20:00 | | BASEBALL a |
| 20:00–21:00 | QUIZ | |
| 21:00–22:00 | | |
| 22:00–23:00 | | |

Fig.28

| TIME | PROGRAM | | | | |
|------|---------|---|---|---|---|
| | 1 | DIGITAL DATA | 3 | DIGITAL DATA | |
| 19:00—20:00 | BASEBALL 1 | HIGH-RESOLUTION DIGITAL VIDEO SIGNAL (1280x720, 59.94 FRAMES SEQUENTIAL SCANNING) | BASEBALL 1 | LOW-RESOLUTION DIGITAL VIDEO SIGNAL (704x480, 59.94 FRAMES SEQUENTIAL SCANNING) |
| 20:00—21:00 | QUIZ | LOW-RESOLUTION DIGITAL VIDEO SIGNAL (704x480, 59.94 FRAMES SEQUENTIAL SCANNING) | SOCCER | HIGH-RESOLUTION DIGITAL VIDEO SIGNAL (1280x720, 59.94 FRAMES SEQUENTIAL SCANNING) |
| 21:00—22:00 | FOREIGN FILM | HIGH-RESOLUTION DIGITAL VIDEO SIGNAL (1280x720, 59.94 FRAMES SEQUENTIAL SCANNING) | BASEBALL 2 | |
| 22:00—23:00 | | | NEWS | |

Fig. 32
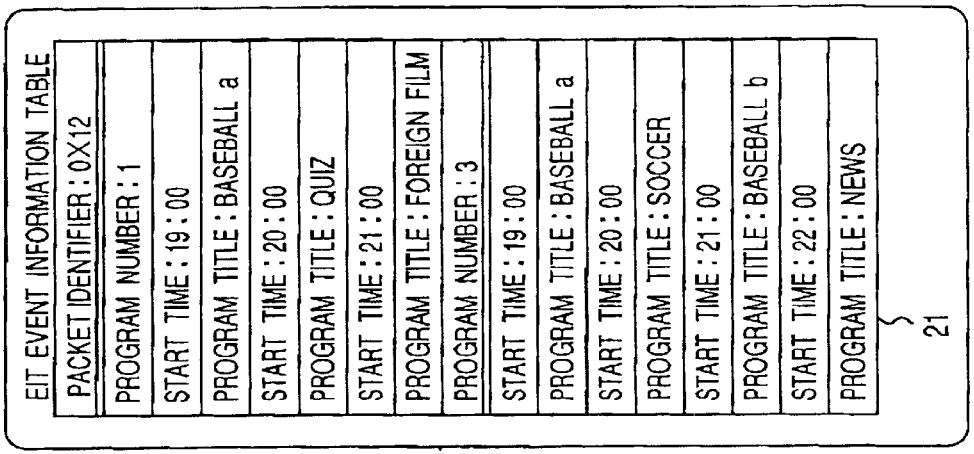
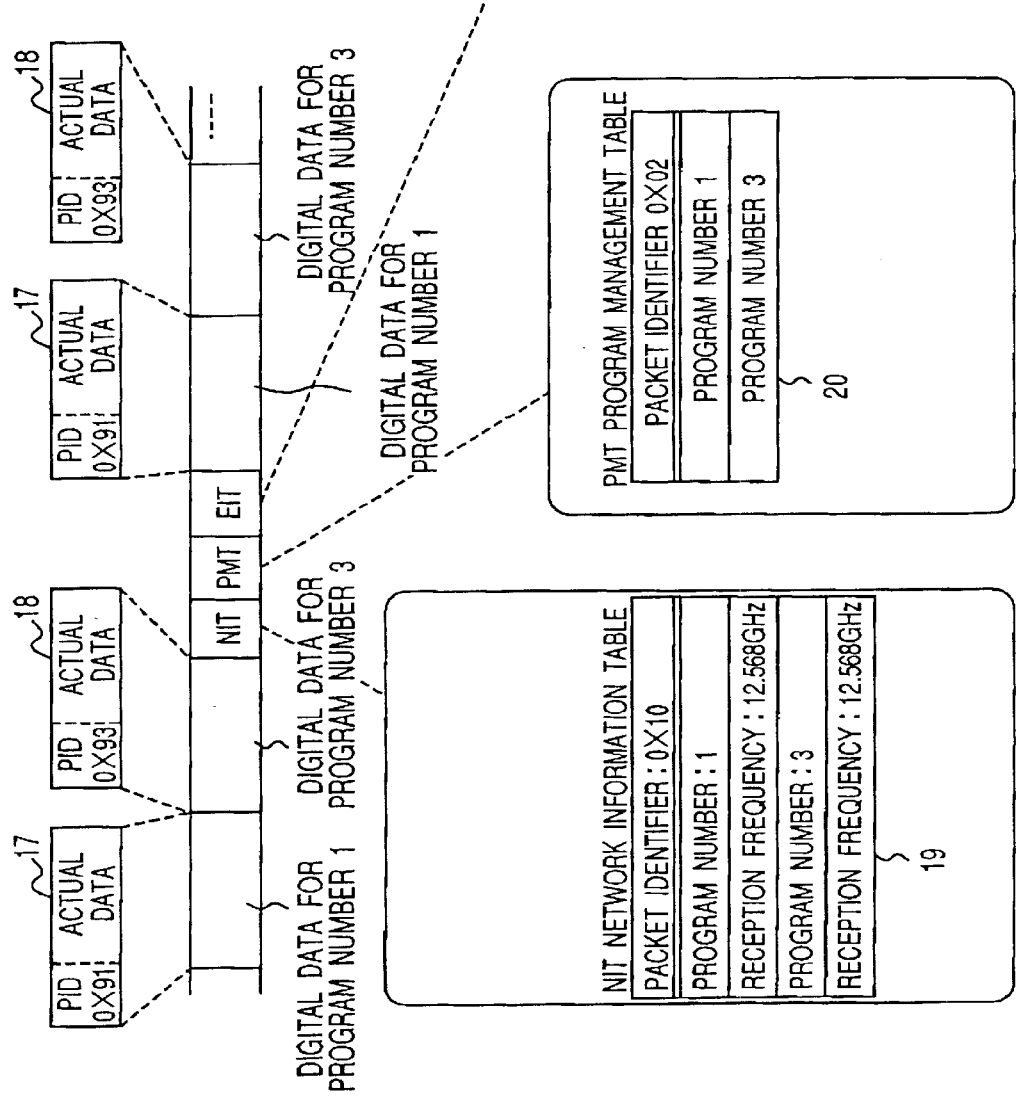

Fig.34

| TIME | CHANNEL ||
| --- | --- | --- |
| | 1 | 3 |
| 19:00—20:00 | BASEBALL a | BASEBALL a |
| 20:00—21:00 | QUIZ | SOCCER |
| 21:00—22:00 | FOREIGN FILM | BASEBALL b |
| 22:00—23:00 | | NEWS |

DIGITAL DATA TRANSMISSION METHOD, DIGITAL DATA TRANSMISSION DEVICE AND DIGITAL DATA RECEIVING DEVICE

TECHNICAL FIELD

The present invention relates to a digital data transmission method for transmitting digital data of differing resolution, a digital data transmission device suitable for implementing this transmission method, and a digital data reception device for receiving transmitted digital data.

BACKGROUND ART

Recently, image and sound compression methods based on MPEG (Moving Picture Experts Group) standards have come to be used, and the methods described in ISO/IEC13818-1, 1383818-2, 13818-3 are commonly known. Furthermore, with regard to broadcast methods, in Japan, CS digital broadcast systems and CATV digital transmission systems are stipulated by Finding No.74 of the Electrical Communications Technology Commission.

With regard to animated image encoding methods, the Main Profile/Main Level (MP@ML) method described in ISO/IEC13818-2 involves compression encoding of a signal running up to a maximum of 30 frames/second based on a sequential scanning system (progressive) or an interlaced scanning system, and this is suitable for conventional television broadcast.

FIG. 32 is a diagram showing the composition of transmission data in a conventional transmission method for image data.

In this example, image data for program number 1 and program number 3 in a band centred on a reception frequency of 12.568 GHz is superimposed with NIT (network information table), PMT (program maintenance table), and EIT (event information table), in packet units. The data structure in these packets and the standards for their multiplexing are stipulated in detail by ISO/IEC13818-1, 13818-2, 13818-3 and Finding No.74 of the Electrical Communications Technology Commission.

In this diagram, numeral 17 is a packet of image data for program number 1, and by defining its leading packet identifier PID as 0x91, it is possible for this packet to be recognized as an image data packet for program number 1. Numeral 18 is an image data packet for program number 3, and by defining its leading packet identifier PID as 0x93, it is possible for this packet to be recognized as an image data packet for program number 3.

Numeral 19 is an NIT (network information table) packet, which defines the frequency at which the image data relating to program number 1 and program number 3 is transmitted. In the present example, it indicates that the image data for program number 1 and program number 3 is superimposed in the 12.568 GHz band, as described above.

Numeral 20 is a PMT (program maintenance table) packet and in the present example, it indicates that the packet identifier for the program number 1 image data is contained in packet 0x91, and the packet identifier for the program number 3 image data is contained in packet 0x93.

Numeral 21 is an EIT (event information table) packet which is a table of the program contents. In the present example, it shows that program number 1 will be broadcasting baseball a between 19:00–20:00, a quiz between 20:00–21:00, and a foreign film from 21:00 onwards, whilst program number 3 will be broadcasting baseball a between 19:00–20:00, soccer between 20:00–21:00, baseball b between 21:00–22:00, and news from 22:00 onwards.

FIG. 33 is a compositional diagram of a conventional transmission device 45 and reception device 46 for image data. In the diagram, numeral 47 denotes compression encoding means, which compresses and encodes an input digital video signal, in this case, for example, an interlaced scanning signal or a sequential scanning signal running at 30 frames or less, in accordance with ISO/IEC138318-2. Numeral 48 denotes multiplexing means for multiplexing the image data for program number 1 and program number 3, and numeral 49 denotes modulating means for performing modulation, such as QPSK, or the like.

Numeral 50 denotes demodulating means for demodulating information containing at the least image data multiplexed and transmitted in order to broadcast programs, and in FIG. 32, demodulating means 50 demodulates image data for program number 1, image data for program number 3, NIT, PMT and EIT. Numeral 51 denotes separating means for separating information containing image data demodulated by demodulating means 50. 52 denotes program selecting means, which receives a program selection control made by the operator (user) and indicates the selected program to the demodulating means 50 and separating means 51. Examples of program selecting means 52 include commonly and widely used devices, such as a remote control device for selecting television programs, or channel selection by television channel buttons or a PC mouse. Numeral 53 denotes image decoding means for decoding image data separated by separating means 51, which in the present example involves a bit stream encoded by an MP@ML system, and outputting this data in the form of a video signal to image display means 54.

In addition to these elements, a standard image data reception device also requires various components, such as a decoding section for decoding sound data, for example, but since these components do not relate directly to the present invention, a description thereof is omitted here.

Below, the operation of a conventional transmission and reception device constituted as described above is described.

Firstly, when program selecting means 52 receives a program selection control from the operator, it indicates the selected program to demodulating means 50. Demodulating means 50 then demodulates the image data for the designated channel. Separating means 51 separates the image data in the information demodulated by demodulating means 50 on the basis of the instruction from program selecting means 52.

In specific terms, if an instruction is given indicating that the data for program number 1 is to be reproduced, then the value of the packet identifier 0x91 of the image data in program number 1 is obtained from the PMT value, and the packet having packet identifier 0x91 is extracted and transferred to subsequent processing. Furthermore, if an instruction is given indicating that the data for program number 3 is to be reproduced, then the value of the packet identifier 0x93 of the image data in program number 3 is obtained from the PMT value, and the packet having packet identifier 0x93 is extracted and transferred to subsequent processing.

Image decoding means 53 decodes the image data separated by separating means 51 and outputs this data in the form of a video signal.

DISCLOSURE OF THE INVENTION (Technical Problems to be Solved by the Invention)

Recently, attention has started to focus on animated images having higher resolution than interlaced scanning signals or sequential scanning signals operating at 30 frames or less and compression encoded by a conventional Main Profile/Main Level (MP@ML) method, as described above. In this case, the frame number may be, for example, 59.94 frames/seconds, namely, twice the NTSC frame rate, and systems conforming to main profile H14 (MP@H14) in ISO/IEC13818-2 have been envisaged.

Therefore, it is anticipated that, in the future, low-resolution image data and high-resolution image data will be multiplexed and broadcast simultaneously by hierarchical encoding, and moreover, hierarchical encoded data and non-hierarchical encoded data will be multiplexed and broadcast simultaneously. However, in a conventional composition as described above, it is not possible to identify between hierarchical encoding and non-hierarchical encoding, or between low-resolution image data and high-resolution image data, so if it is supposed that MP@ML image data is multiplexed and transmitted with image data relating to a sequential scanning signal of image size 704× 480 and operating at a higher frame frequency than MP@ML, for example, 59.94 frames, then although the frame number will be 59.94 frames/seconds, which is twice the frame rate of NTSC, for example, and the signal will conform to Main Profile H14 (MP@H14), since the image size is small it will be given a subset positioning and when decoded by the aforementioned image decoding means 53, it will not be decoded properly since it exceeds the capacity of the image decoding means 53, and hence a correct image signal will not be output and malfunction will occur.

Moreover, as shown in FIG. 34, in a program table displayed by a conventional image data reception device 46, it is not possible to distinguish between programs having image data of different resolutions, when low-resolution image data and high-resolution image data is broadcast simultaneously by multiplexing. Therefore, the operator is able is select a program number having high-resolution image data which cannot be decoded, and if this occurs, the signal will not be properly decoded and a distorted image will be output, which the operator may identify to be a malfunction.

In this way, in the prior art, if digital data of different resolutions is transmitted by multiplexing, then since the high-resolution digital data cannot be decoded correctly, a distorted image is output, causing confusion and inconvenience to the operator during use, and providing an image content which is not intended by the program supplier.

The present invention was devised with the foregoing in view, an object thereof being to provide a digital data transmission method and digital data transmission device whereby digital data is transmitted such that the receiving side can identify whether it is hierarchically encoded or non-hierarchically encoded, and digital data of differing resolutions can be reproduced correctly at the receiving side, thereby increasing the freedom of program composition.

It is a further object of the present invention to provide a digital data reception device which does not cause problems, such as confusing the operator, when digital data of differing resolutions is transmitted by multiplexing, even if the reception device is capable of decoding one type of digital data only, and moreover, to provide a digital data reception device whereby a first digital data and second digital data can be received and reproduced correctly.

(Means for Solving the Problems)

In order to achieve the aforementioned objects, the present invention is constituted in the following way.

Namely, in the present invention, a low-resolution digital video signal and a high-resolution digital video signal are generated from an input digital video signal by means of hierarchical encoding, and when the first and second digital data obtained by encoding the two digital video signals is divided into packet units and then multiplexed and transmitted with packets containing information relating to programs, identification information for identifying the first digital data and the second digital data is given in the packets containing information relating to the programs.

By means of the present invention, the receiving side is able to identify the first and second digital data on the basis of the identification information described in the packets containing information relating to programs, thereby enabling the low-resolution digital video signal and the high-resolution digital video signal to be reproduced correctly and hence allowing the variety of programs transmitted to be increased.

A first aspect of the present invention is a method for generating a low-resolution digital video signal by frequency scaling of an input digital video signal. dividing first digital data obtained by encoding the low-resolution digital video signal and second digital data obtained by encoding the input digital video signal into packet units, respectively, and multiplexing and transmitting the data with packets containing information relating to programs, wherein identification information for identifying non-hierarchical encoding and hierarchical encoding is described in the packets containing information relating to programs, thereby enabling the receiving side to identify whether data is non-hierarchically encoded or hierarchically encoded on the basis of the identification information.

A second aspect of the present invention is a method for generating a high-resolution digital video signal by frequency scaling of an input digital video signal, dividing second digital data obtained by encoding the high-resolution digital video signal and first digital data obtained by encoding the input digital video signal into packet units, respectively, and multiplexing and transmitting the data with packets containing information relating to programs, wherein identification information for identifying non-hierarchical encoding and hierarchical encoding is described in the packets containing information relating to programs, thereby enabling the receiving side to identify whether data is non-hierarchically encoded or hierarchically encoded on the basis of the identification information.

A third aspect of the present invention is a method for dividing first digital data obtained by encoding a digital video signal generated from an input digital video signal by means of a low-pass filter and second digital data obtained by encoding a digital video signal generated from the input digital video signal by means of a high-pass filter in packet units, respectively, and multiplexing and transmitting the data with packets containing information relating to programs, wherein identification information for identifying non-hierarchical encoding and hierarchical encoding is described in the packets containing information relating to programs, thereby enabling the receiving side to identify whether data is non-hierarchically encoded or hierarchically encoded on the basis of the identification information.

A fourth aspect of the present invention is a method for generating a low-resolution digital video signal by frequency scaling of an input digital video signal, dividing first digital data obtained by encoding the low-resolution digital video signal and second digital data obtained by encoding the input digital video signal into packet units, respectively, and multiplexing and transmitting the data with packets containing information relating to programs, wherein identification information for identifying the first digital data and the second digital data is described in the packets containing information relating to programs, thereby enabling the receiving side to identify the first and second digital data on the basis of the identification information. Furthermore, since a low-resolution digital video signal is generated and transmitted by frequency scaling of a high-resolution input digital video signal, it is possible to receive and reproduce a low-resolution digital video signal at the receiving side, even using a relatively inexpensive low-resolution receiving device.

A fifth aspect of the present invention is a method for generating a high-resolution digital video signal by frequency scaling of an input digital video signal, dividing second digital data obtained by encoding the high-resolution digital video signal and first digital data obtained by encoding the input digital video signal into packet units, respectively, and multiplexing and transmitting the data with packets containing information relating to programs, wherein identification information for identifying the first digital data and the second digital data is described in the packets containing information relating to programs, thereby enabling the receiving side to identify the first and second digital data on the basis of the identification information and to reproduce correctly a low-resolution digital video signal and a high-resolution digital video signal. Moreover, since the input digital video signal has low resolution, the transmitting system can be composed relatively inexpensively, but since a high-resolution digital video signal is generated and transmitted by frequency scaling of a low-resolution input digital video signal, high-resolution images can still be received and reproduced using a high-resolution reception device.

A sixth aspect of the present invention is a method for dividing first digital data obtained by encoding a digital video signal generated from an input digital video signal by means of a low-pass filter and second digital data obtained by encoding a digital video signal generated from the input digital video signal by means of a high-pass filter in packet units, respectively, and multiplexing and transmitting the data with packets containing information relating to programs, wherein identification information for identifying the first digital data and the second digital data is described in the packets containing information relating to programs, thereby enabling the receiving side to identify the first and second digital data on the basis of the identification information and reproduce a digital video signal correctly.

A seventh aspect of the present invention is the invention according to any of the fourth to sixth aspects, wherein decoding programs for decoding at least one of the first digital data and the second digital data are divided into packet units and multiplexed with the packets containing information relating to programs, thereby enabling the decoding programs to be changed readily at the transmitting side in response to technological advances, or the like.

An eighth aspect of the present invention is the invention according to any of the first to seventh aspects, wherein the packets containing information relating to programs form a program management table showing which program is transmitted by which packet, thereby enabling the receiving side to identify non-hierarchical encoding and hierarchical encoding, or the first and second digital data, on the basis of the identification information in this program management table, such that the low-resolution digital video signal and high-resolution digital video signal can be reproduced correctly. Moreover, by using a program management table in this way, it is possible to change the resolution used in transmission, in program number units.

A ninth aspect of the present invention is the invention according to any of the first to seventh aspects, wherein the packets containing information relating to programs form a program contents table showing the contents of programs, thereby enabling the receiving side to identify non-hierarchical encoding or hierarchical encoding, or the first and second digital data, on the basis of the identification information in this program contents table, such that the low-resolution digital video signal and high-resolution digital video signal can be reproduced correctly. By using a program contents table in this way, it is possible to change the resolution used in transmission, in program units.

A tenth aspect of the present invention is the invention according to any of the first to seventh aspects, wherein the packets containing information relating to programs form a network information table showing which programs are broadcast by which channel, thereby enabling the receiving side to identify non-hierarchical encoding or hierarchical encoding, or the first and second digital data, on the basis of the identification information in this network information table, such that the low-resolution digital video signal and high-resolution digital video signal can be reproduced correctly. By using a network information table in this way, it is possible to change the resolution used in transmission, for each network, in other words, for each transponder.

An eleventh aspect of the present invention is a digital data transmission device comprising: hierarchical encoding means for generating a low-resolution digital video signal by frequency scaling of an input digital video signal and outputting first digital data obtained by encoding the low-resolution digital video signal, as well as outputting second digital data obtained by encoding the input digital video signal; identification information generating means for generating identification information for identifying non-hierarchical encoding and hierarchical encoding; and multiplexing means for dividing the first digital data and the second digital data into packet units and multiplexing the data with packets containing information relating to programs; wherein the identification information is described in the packets containing information relating to programs, thereby enabling the receiving side to identify non-hierarchically encoded data and hierarchically encoded data on the basis of the identification information.

A twelfth aspect of the present invention is a digital data transmission device comprising: hierarchical encoding means for generating a high-resolution digital video signal by frequency scaling of an input digital video signal and outputting second digital data obtained by encoding the high-resolution digital video signal, as well as outputting first digital data obtained by encoding the input digital video signal; identification information generating means for generating identification information for identifying non-hierarchical encoding and hierarchical encoding; and multiplexing means for dividing the first digital data and the second digital data into packet units and multiplexing the data with packets containing information relating to programs; wherein the identification information is described in the packets containing information relating to programs, thereby enabling the receiving side to identify non-hierarchically encoded data and hierarchically encoded data on the basis of the identification information.

A thirteenth aspect of the present invention is a digital data transmission device comprising: hierarchical encoding means for outputting first digital data obtained by encoding a digital video signal generated from an input digital video signal by means of a low-pass filter and second digital data obtained by encoding a digital data generated from the input digital video signal by means of a high-pass filter; identification information generating means for generating identification information for identifying non-hierarchical encoding and hierarchical encoding; and multiplexing means for dividing the first digital data and the second digital data into packet units and multiplexing the data with packets containing information relating to programs; wherein the identification information is described in the packets containing information relating to programs, thereby enabling the receiving side to identify non-hierarchically encoded data and hierarchically encoded data on the basis of the identification information.

A fourteenth aspect of the present invention is a digital data transmission device comprising: hierarchical encoding means for generating a low-resolution digital video signal by frequency scaling of an input digital video signal and outputting first digital data obtained by encoding the low-resolution digital video signal, as well as outputting second digital data obtained by encoding the input digital video signal; identification information generating means for generating identification information for identifying the first digital data and the second digital data; and multiplexing means for dividing the first digital data and the second digital data into packet units and multiplexing the data with packets containing information relating to programs; wherein the identification information is described in the packets containing information relating to programs, thereby enabling the receiving side to identify the first and second digital data on the basis of the identification information, such that the low-resolution digital video signal and the high-resolution digital video signal can be reproduced correctly. Moreover, since the low-resolution digital video signal is generated and transmitted by frequency scaling of a high-resolution input digital video signal, it is possible to reproduce a low-resolution digital video signal at the receiving side using an inexpensive or reception device.

A fifteenth aspect of the present invention is a digital data transmission device comprising: hierarchical encoding means for generating a high-resolution digital video signal by frequency scaling of an input digital video signal and outputting second digital data obtained by encoding the high-resolution digital video signal, as well as outputting first digital data obtained by encoding the input digital video signal; identification information generating means for generating identification information for identifying the first digital data and the second digital data; and multiplexing means for dividing the first digital data and the second digital data into packet units and multiplexing the data with packets containing information relating to programs; wherein the identification information is described in the packets containing information relating to programs, thereby enabling the receiving side to identify the first and second digital data on the basis of the identification information, such that the low-resolution digital video signal and the high-resolution digital video signal can be reproduced correctly.

A sixteenth aspect of the present invention is a digital data transmission device comprising: hierarchical encoding means for outputting first digital data obtained by encoding a digital video signal generated from an input digital video signal by means of a low-pass filter and second digital data obtained by encoding a digital data generated from the input digital video signal by means of a high-pass filter; identification information generating means for generating identification information for identifying the first digital data and the second digital data; and multiplexing means for dividing the first digital data and the second digital data into packet units and multiplexing the data with packets containing information relating to programs; wherein the identification information is described in the packets containing information relating to programs, thereby enabling the receiving side to identify the first and second digital data on the basis of the identification information, such that a digital video signal can be reproduced correctly.

A seventeenth aspect of the present invention is the invention according to any of the fourteenth to sixteenth aspects, comprising decoding program generating means for generating decoding programs for decoding at least one of the first digital data and the second digital data, the decoding programs being divided into packet units and multiplexed with the packets containing information relating to programs, thereby enabling the decoding programs to be changed readily at the transmitting side in response to technological advances, or the like.

An eighteenth aspect of the present invention is the invention according to any of the eleventh to seventeenth aspects, wherein the packets containing information relating to programs form a program management table showing which program is transmitted by which packet, thereby enabling the receiving side to identify non-hierarchically encoded data and hierarchically encoded data, or first and second digital data, on the basis of the identification information in the program management table, such that the low-resolution digital video signal and high-resolution digital video signal can be reproduced correctly. Furthermore, by using a program management table in this way, the resolution used in transmission can be changed in program number units.

A nineteenth aspect of the present invention is the invention according to any of the eleventh to seventeenth aspects, wherein the packets containing information relating to programs form a program contents table showing the contents of programs, thereby enabling the receiving side to identify non-hierarchically encoded data and hierarchically encoded data, or first and second digital data, on the basis of the identification information in the program contents table, such that the low-resolution digital video signal and high-resolution digital video signal can be reproduced correctly. Furthermore, by using a program contents table in this way, the resolution used in transmission can be changed in program units.

A twentieth aspect of the present invention is the invention according to any of the eleventh to seventeenth aspects of the invention, wherein the packets containing information relating to programs form a network information table showing which programs are broadcast by which channel, thereby enabling the receiving side to identify non-hierarchically encoded data and hierarchically encoded data, or first and second digital data, on the basis of the identification information in the network information table, such that the low-resolution digital video signal and high-resolution digital video signal can be reproduced correctly. Furthermore, by using a network information table in this way, the resolution used in transmission can be changed for each network, in other words, for each transponder.

A twenty-first aspect of the present invention is the invention according to the eighteenth aspect of the present invention, wherein the identification information is described in a system control identifier of a program information descriptor in the program management table, thereby enabling the receiving side to identify non-hierarchically encoded data and hierarchically encoded data, or first and second digital data, on the basis of the identification information in the system control identifier, such that the low-resolution digital video signal and high-resolution digital video signal can be reproduced correctly.

A twenty-second aspect of the present invention is the invention according to the eighteenth aspect, wherein the identification information is described in a stream identifier of a program information descriptor in the program management table, thereby enabling the receiving side to identify non-hierarchically encoded data and hierarchically encoded data, or first and second digital data, on the basis of the identification information in the stream identifier, such that the low-resolution digital video signal and high-resolution digital video signal can be reproduced correctly.

A twenty-third aspect of the present invention is the invention according to the nineteenth aspect, wherein the identification information is described in a component identifier indicating image data attributes in the program contents table, thereby enabling the receiving side to identify non-hierarchically encoded data and hierarchically encoded data, or first and second digital data, on the basis of the identification information in the component identifier, such that the low-resolution digital video signal and high-resolution digital video signal can be reproduced correctly.

A twenty-fourth aspect of the present invention is the invention according to the nineteenth aspect, wherein the identification information is described as a program information correspondence table showing the correspondence between program information and packet identifiers in the program contents table, thereby enabling the receiving side to identify non-hierarchically encoded data and hierarchically encoded data, or first and second digital data, on the basis of the identification information in the program information correspondence table, such that the low-resolution digital video signal and high-resolution digital video signal can be reproduced correctly.

A twenty-fifth aspect of the present invention is the invention according to the twentieth aspect, wherein the identification information is described in a network identifier for identifying the network transmitting the image data in the network information table, thereby enabling the receiving side to identify non-hierarchically encoded data and hierarchically encoded data, or first and second digital data, on the basis of the identification information in the network identifier, such that the low-resolution digital video signal and high-resolution digital video signal can be reproduced correctly.

A twenty-sixth aspect of the present invention is the invention according to any of the fourteenth to twenty-fifth aspects, wherein charge information relating to the first digital data and the second digital data is transmitted supplementarily, thereby enabling the charge situation to be understood at the receiving side.

A twenty-seventh aspect of the present invention is the invention according to any of the eleventh to twenty-sixth aspects, wherein the first digital data is a signal obtained by compression encoding of a sequential scanning signal operating at 720 maximum effective horizontal pixels, 480 maximum effective vertical scanning lines, and a maximum frame rate of 60 frames/second, thereby enabling a low-resolution image to be displayed by means of a sequential scanning signal operating at 720 maximum effective horizontal pixels, 480 maximum effective vertical scanning lines, and a maximum frame rate of 60 frames/second.

A twenty-eighth aspect of the present invention is a digital data reception device for receiving a signal transmitted by multiplexing first digital data and second digital data, obtained by encoding a low-resolution digital video signal and a high-resolution digital video signal, with identification information for identifying both of the digital data, and reproducing the low-resolution digital video signal and the high-resolution digital video signal, comprising: demodulating means for demodulating the first digital data, the second digital data and information containing the identification information; separating means for separating and extracting digital data corresponding to a program selection operation on the basis of the identification information and the program selection operation; low-resolution decoding means for decoding first digital data separated and extracted by the separating means and outputting the data as a low-resolution digital video signal; and high-resolution decoding means for decoding second digital data separated and extracted by the separating means and outputting the data as a high-resolution digital video signal, thereby enabling the first and second digital data and identification information to be demodulated, such that a selected low-resolution digital video signal or high-resolution digital video signal can be reproduced correctly.

A twenty-ninth aspect of the present invention is a digital data reception device for receiving a signal transmitted by multiplexing first digital data and second digital data, obtained by encoding a low-resolution digital video signal and a high-resolution digital video signal, with identification information for identifying both the digital data and a first and a second decoding program for decoding both the digital data, respectively, and reproducing the low-resolution digital video signal and the high-resolution digital video signal, comprising: demodulating means for demodulating the first and second digital data, and information containing the identification information and the first and second decoding programs; separating means for separating and extracting digital data and a decoding program corresponding to a program selection operation, on the basis of the identification information and the program selection operation; low-resolution computing means for decoding first digital data separated and extracted by the separating means in accordance with the first decoding program and outputting the data as a low-resolution digital video signal; and high-resolution computing means for decoding second digital data separated and extracted by the separating means in accordance with the second decoding program and outputting the data as a high-resolution digital video signal, thereby enabling the first and second digital data and identification information to be demodulated such that a selected low-resolution digital video signal or high-resolution digital video signal can be reproduced correctly on the basis of the program selection operation and the identification information, whilst also allowing the decoding programs to be changed readily on the transmitting side in response to technological advances, or the like.

A thirtieth aspect of the present invention is a digital data reception device for receiving a signal transmitted by multiplexing first digital data and second digital data, obtained by encoding a low-resolution digital video signal and a high-resolution digital video signal, with identification information for identifying both the digital data, and reproducing the low-resolution digital video signal, comprising: demodulating means for demodulating the first digital data, the second digital data and information containing the identification information; separating means for separating and extracting digital data corresponding to a program selection operation on the basis of the identification information and the program selection operation; low-resolution decoding means for decoding first digital data separated and extracted by the separating means and outputting the data as a low-resolution digital video signal; and prohibiting means for prohibiting decoding of second digital data separated and extracted by the separating means, thereby preventing display of distorted reproduced images, since decoding is not carried out if the high-resolution digital video signal is selected by the program selection operation.

A thirty-first aspect of the present invention is a digital data reception device for receiving a signal transmitted by multiplexing first digital data and second digital data, obtained by encoding a low-resolution digital video signal and a high-resolution digital video signal, with identification information for identifying both the digital data and a program contents table showing the contents of programs at different times and the contents of the digital data constituting each program, and reproducing a selected program, comprising: program table creating means for creating a program table showing the contents of programs at different times and indicating whether the digital data constituting each program is the first digital data or second digital data, on the basis of the program contents table and the identification information, the program table created being displayed on image display means, thereby enabling an operator (user) to select a program to be reproduced, on the basis of the program table.

A thirty-second aspect of the present invention is the invention according to the thirty-first aspect, wherein the programs relating to the first digital data or the programs relating to the second digital data are displayed as a program table, thereby preventing the operator from selecting a program which cannot be received and reproduced, by displaying a program table showing only programs having a low-resolution digital video signal in low-resolution reception devices which can only receive and reproduce low-resolution digital video signals.

A thirty-third aspect of the present invention is the invention according to any of the twenty-eighth to thirty-second aspects, wherein the first digital data is a signal obtained by compression encoding of a sequential scanning signal operating at 720 maximum effective horizontal pixels×480 effective vertical scanning lines and a maximum frame rate of 60 frames/second, thereby enabling a low-resolution image to be displayed by means of a sequential scanning signal operating at 720 maximum effective horizontal pixels×480 effective vertical scanning lines and a maximum frame rate of 60 frames/second.

BRIEF DESCRIPTION OF THE DRAWINGS

FIG. 3 is a diagram illustrating the data composition of PMT (program management table).

FIG. 4 is a diagram illustrating least significant 8-bit code allocation examples for system control identifiers.

FIG. 5 is a diagram illustrating middle 6-bit code allocation examples for system control identifiers.

FIG. 8 is a diagram illustrating the data composition of a stream identifier in a PMT (program management table).

FIG. 11 is a diagram illustrating a further data composition of a stream identifier in a PMT (program management table).

FIG. 12 is a diagram illustrating a further data composition of a stream identifier in a PMT (program management table).

FIG. 13 is a diagram illustrating the composition of transmission data according to a third embodiment of the present invention.

FIG. 14 is a diagram illustrating the data composition of an EIT (event information table) according to the third embodiment of the present invention.

FIG. 15 is an example of code allocations for component type codes in the case of the second digital data.

FIG. 16 is an example of code allocations for component type codes in the case of the first digital data.

FIG. 20 is a diagram illustrating the data composition of an NIT (network information table) according to the fourth embodiment of the present invention.

FIG. 21 is a diagram illustrating network ID code allocation examples according to a fourth embodiment of the present invention.

FIG. 23 is a diagram illustrating least significant 8-bit code allocation examples for system control identifiers according to a fifth embodiment of the present invention.

FIG. 24(A) and FIG. 24(B) show flowcharts corresponding to FIG. 6 in the case of the fifth embodiment of the present invention.

FIG. 25 is a compositional diagram of a system wherein a digital data transmission method according to a sixth embodiment of the present invention is applied.

FIG. 26(A) and FIG. 26(B) 26 show flowcharts corresponding to FIG. 6 in the case of the sixth embodiment of the present invention.

FIG. 27 is a diagram illustrating display examples of program tables according to the sixth embodiment of the present invention.

FIG. 28 is a diagram illustrating further display examples of program tables according to the sixth embodiment of the present invention.

FIG. 32 is a diagram illustrating the composition of transmission data in a prior art example.

FIG. 34 is a diagram illustrating a program table according to a prior art example.

BEST MODE FOR CARRYING OUT THE INVENTION (First Embodiment)

Figure 1:
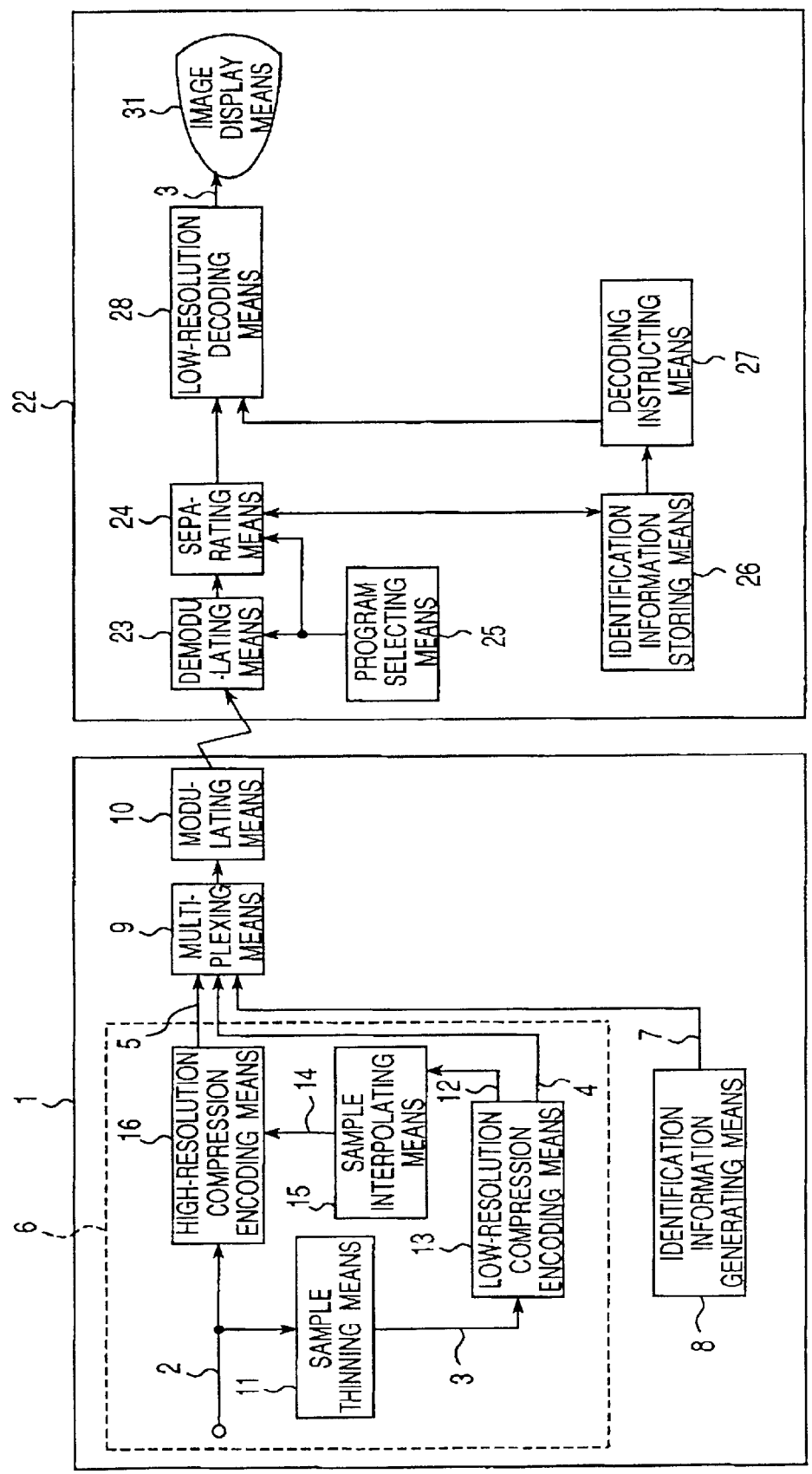
FIG. 1 is a compositional diagram of a system wherein a digital data transmission method according to a first embodiment of the present invention is applied.

FIG. 1 is a compositional diagram showing a system wherein a digital data transmission method according to a first embodiment of the present invention is applied.

In the digital data transmission method according to this embodiment, a low-resolution digital video signal is generated by frequency scaling of an input digital video signal, first digital data obtained by encoding the low-resolution digital video signal and second data obtained by encoding the aforementioned input digital video signal are divided respectively into packets units and multiplexed and transmitted with packets containing information relating to programs, and identification information for identifying whether data is hierarchically encoded or non-hierarchically encoded is described in the packets containing information relating to programs, as explained below.

To achieve the foregoing, a digital data transmission device 1 comprises: hierarchical encoding means 6 for generating a low-resolution digital video signal 3 by frequency scaling of an input digital video signal 2 and outputting first digital data 4 obtained by encoding the low-resolution digital video signal 3, as well as second digital data 5 obtained by encoding the input digital video signal 2; identification information generating means 8 for generating identification information 7 for identifying whether data is non-hierarchically encoded or hierarchically encoded; multiplexing means 9 for dividing the first digital data 4 and second digital data 5 into packet units and multiplexing them with packets containing information relating to programs; and modulating means 10 for modulating and transmitting the output from multiplexing means 9. The identification information is described in the packets containing information relating to programs, as explained below.

Hierarchical encoding means 6 comprises: sample thinning means 11 for generating a low-resolution digital video signal, wherein the spatial resolution of the input digital video signal 2 is reduced by frequency scaling, through thinning out the picture elements by low pass filtering of the input digital video signal 2; low-resolution compression encoding means 13 for generating first digital data 4 and a predicted image signal 12 by compression encoding of this low-resolution digital video signal 3; sample interpolating means 15 for generating an up-sampling signal 14 by up-sample processing of the predicted image signal 12; and high-resolution compression encoding means 16 for compression encoding of the input digital video signal 2 without involving a reduction in resolution.

The high-resolution compression encoding means 16 generates second digital data 5 by compression encoding of the input digital video signal 2 in accordance with, MPEG2, for example, which is an international standard for image compression technology. The low-resolution compression encoding means 13 similarly carries out compression encoding of the low-resolution digital video signal in accordance with MPEG2. The up-sampling signal 14 generated by the sample interpolating means 15 is supplied to the high-resolution compression encoding means 16 as one predictive mode. Here, the first digital data 4 is a signal obtained by compression encoding of a sequential scanning signal operating at an image size of 720×480 and a frame speed of 59.94 frames/second, for example. This corresponds to a system operating a current NTSC format as a sequential scanning signal. The second digital data 5 corresponds to a signal obtained by compression encoding the high-resolution component of a sequential scanning signal operating at an image size of 1280×720 and frame speed of 59.94 frames/second, for example.

In the present embodiment, non-hierarchically encoded data and hierarchically encoded data are multiplexed and transmitted, so in order for the receiver side to perform decoding correctly, it is necessary to identify whether data is non-hierarchically encoded or hierarchically encoded.

Therefore, identification information generating means 8 generates identification information 7 for identifying whether data is non-hierarchically encoded or hierarchically encoded.

Below, the process of transmitting this identification information with the packets containing information relating to programs will be described.

Figure 2:
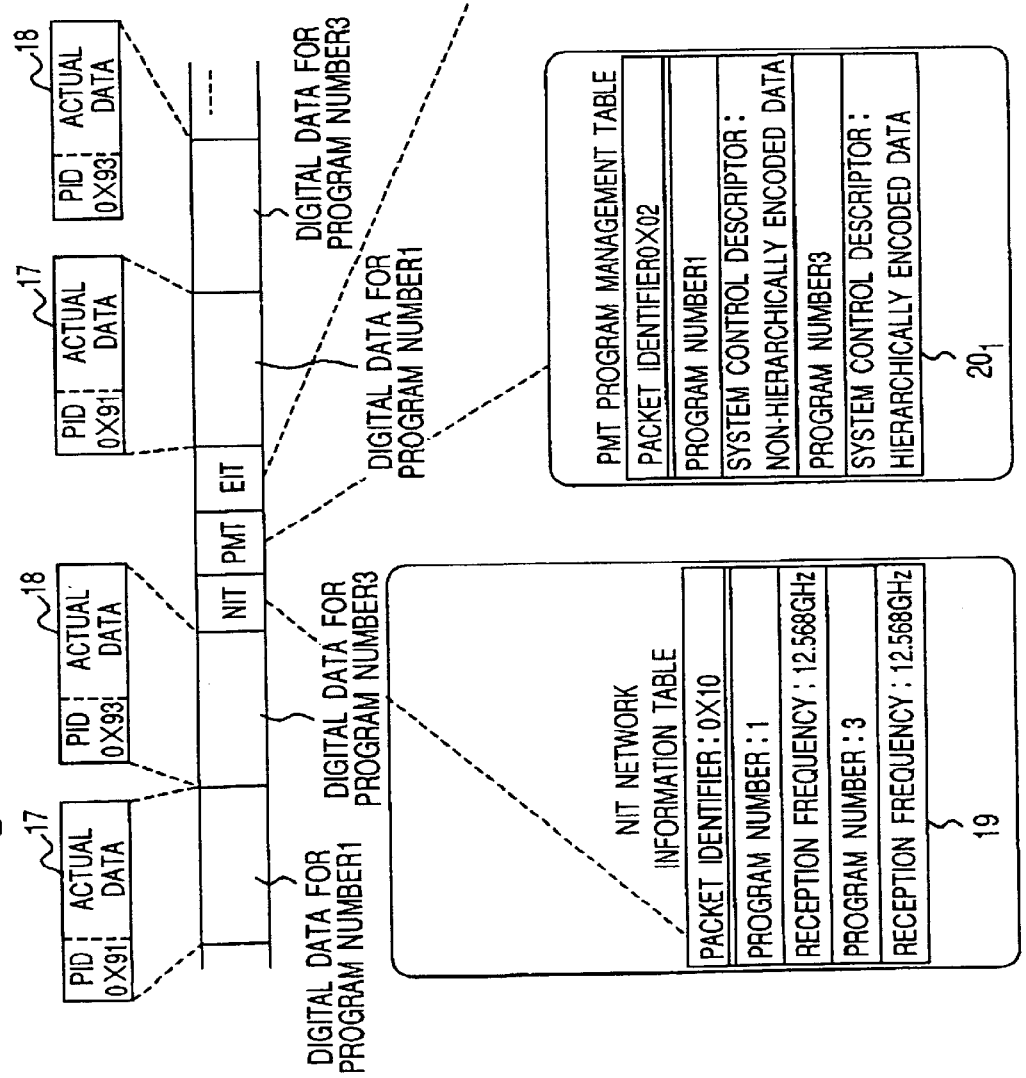
FIG. 2 is a diagram illustrating the composition of transmission data according to the first embodiment of the present invention.

FIG. 2 is a diagram illustrating the composition of transmission data in this first embodiment, and labels which are the same as the prior art example in FIG. 32 indicate the same parts of the composition. Described briefly, image data 17, 18 for program number 1 and program number 3 centred on a reception frequency of 12.568 GHz are multiplexed in packet units with an NIT (network information table) 19, PMT (program management table), and EIT (event information table) 21 containing service information relating to the programs.

In the present embodiment, program number 1 is non-hierarchically encoded and is constituted by the first digital data 4, whilst program number 3 is hierarchically encoded and is constituted by the first and second digital data 4, 5. In other words, non-hierarchically encoded data and hierarchically encoded data are multiplexed and transmitted together.

For this purpose, in this embodiment, it is possible to designate a system control identifier in the PMT (program management table) $20_1$, and identification information in the form of a code is described therein such that data can be identified as either non-hierarchically encoded data or hierarchically encoded data.

FIG. 3 is a diagram illustrating a data composition of the PMT (program management table) 201. Here, the service ID is the program number. As shown in FIG. 3, the system control identifier is located in the descriptor of the program information in the PMT and it has a 16-bit structure. Of these 16 bits, the 2 most significant bits indicate the system classification, the middle 6 bits identify the report level technology system, and the 8 least significant bits identify the private standard technology system, which can be determined by a private company. The system classification in the two most significant bits is used to identify whether the information contained in the subsequent bits is to be provided to all users or whether it is commercial information, or the like.

FIG. 4 shows code allocation examples in a case where the least significant 8 bits of the aforementioned system control identifier indicate whether data is non-hierarchically encoded data or hierarchically encoded data. In FIG. 4, non-hierarchical encoding is designated as code value 0x01 and hierarchical encoding is designated as code value 0x02, but other codes may also be used, provided that hierarchical encoding and non-hierarchical encoding can be identified.

FIG. 5 shows code allocation examples in a case where the middle 6 bits of the aforementioned system control identifier are used to identify non-hierarchical encoding and hierarchical encoding. In FIG. 5, the code value for non-hierarchical encoding is 0x01 and the code value for hierarchical encoding is 0x02, but other codes may be used, provided that non-hierarchically encoded data and hierarchically encoded data can be identified.

As described above, identification information for identifying non-hierarchically encoded data and hierarchically encoded data is transmitted by being described in the system control identifier in the PMT (program management table) 201. As illustrated in FIG. 1, the digital data reception device 22, on the other hand, comprises: demodulating means 23 for demodulating the first and second digital data 4, 5 and information containing the identification information; program selecting means 25 for receiving program selection commands from an operator (user) and giving instructions to demodulating means 23 and separating means 24; the aforementioned separating means 24 for separating and extracting digital data selected by program selecting means 25, on the basis of identification information; identification information storing means 26 for storing identification information separated by separating means 24; decoding instructing means for giving a reproduction instruction to low-resolution decoding means 28 on the basis of identification information from the identification information storing means 26; low-resolution decoding means 28 for decoding the non-hierarchically encoded first digital data 4 separated and extracted by separating means 24 and outputting this data in the form of a low-resolution digital video signal 3; and video display means 31 for displaying the digital video signal from low-resolution decoding means 28. Reproduction and display of image data is only carried out in the case of non-hierarchically encoded data of low resolution. A standard video data reception device also requires other constituent elements in addition to these, for example, a decoding section for decoding sound data, or the like, but since these elements do not relate directly to the present invention, description thereof is omitted here.

Figure 6B:
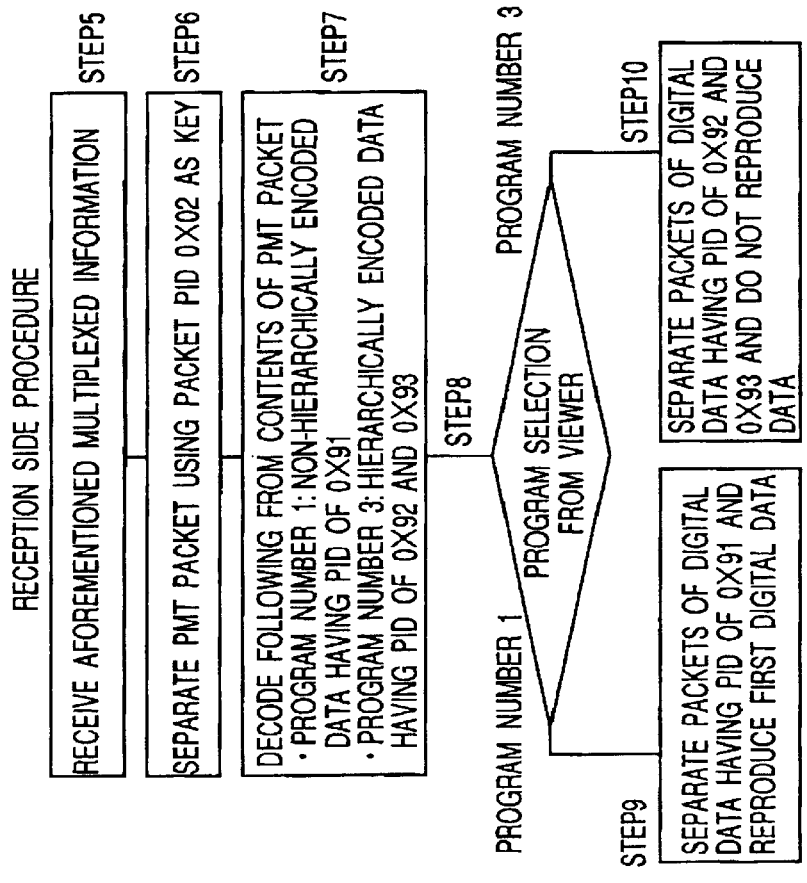
FIG. 6(A) and FIG. 6(B) show transmission side and reception side flowcharts according to the first embodiment of the present invention.
Figure 6A:
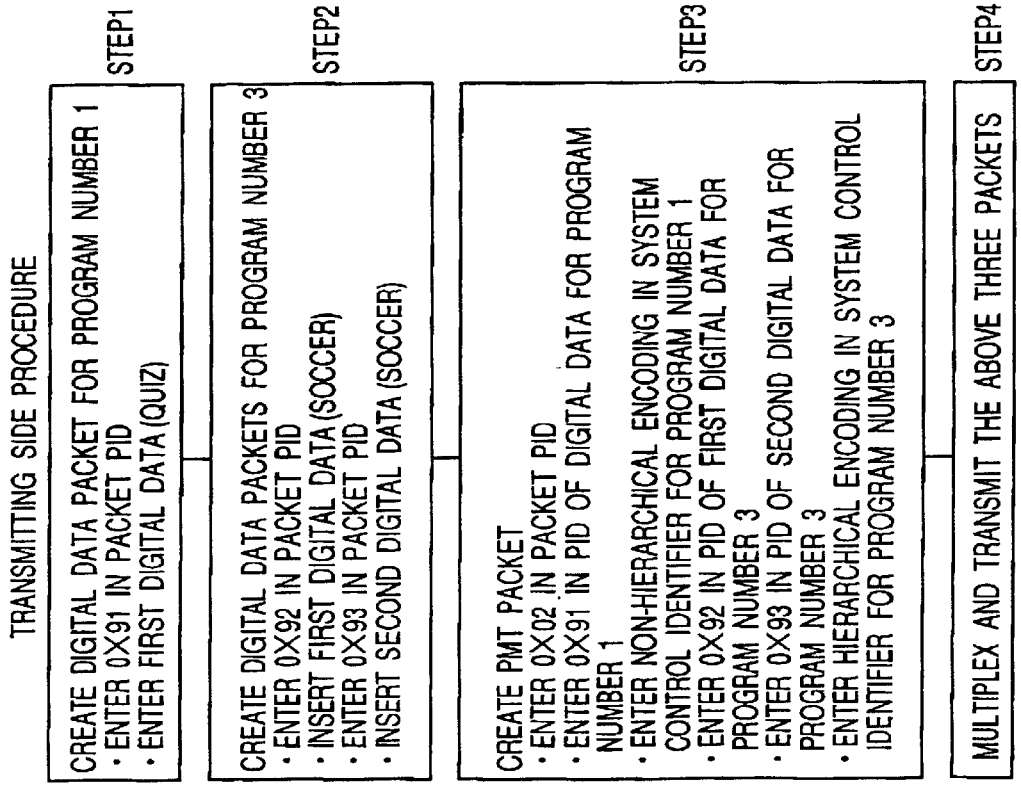

Next, the operation of the transmitting side and receiving side in the present embodiment having the foregoing composition is described on the basis of the flowcharts in FIG. 6(A) and FIG. 6(B).

Here, the number of programs is limited to two, namely, program number 1 and program number 3, and it is assumed that these two programs 1, 3 are multiplexed on a single frequency band. Moreover, the program in program number 1 is non-hierarchically encoded and is constituted by the first digital data, the program name being "quiz", whilst the program in program number 3 is hierarchically encoded and is constituted by the first and second digital data, the program name being "soccer".

On the transmission side, the following procedure is implemented. Firstly, a packet of digital data for program number 1 is created (step 1). A packet identifier PID of "0x91" is attached to the leading bit of the packet, and digital data (quiz) is added after the end of the packet identifier PID to create a packet of uniform size. Here, the PID was taken as "0x91", but any PID may be used, provided that it enables the packet to be distinguished from other packets.

Next, packets of digital data for program number 3 are created (step 2). A packet identifier PID of "0x92" is attached to the leading bit of the packet, and the first digital data (soccer) is added thereafter, whereupon "0x93" is attached to the leading bit of a packet and the second digital data (soccer) is added thereafter, thus creating packets of uniform size. Here, "0x92" and "0x93" are used as PID values, but any PID may be used, provided that they enable the packets to be distinguished from other packets.

Next, a PMT packet is created (step 3). A packet identifier PID of "0x02" is entered at the head of the packet, whereupon "0x91" is entered in the PID for the digital data for program number 1, "0x01" is entered in the 8 lower bits of the system control identifier as identification information for non-hierarchical encoding, "0x92" is entered in the PID for the first digital data for program number 3, "0x93" is entered in the PID for the second digital data, and "0x02" is entered in the 8 lower bits of the system control identifier as identification information for hierarchical encoding. Here, the least significant 8 bits of the system control identifier were used, but the middle 6 bits illustrated in FIG. 5 may also be used for identification information. Furthermore, the packet identifier PID for the PMT packet was taken as "0x02", and this PID is defined in the PAT (Program Association Table) in the MPEG standards.

These various packets are multiplexed and transmitted (step 4). In other words, the aforementioned three types of packet are set to a uniform size, and are multiplexed and then transmitted. Normally, error correction is appended and the data is transmitted by QPSK modulation or QAM modulation, or the like, but since this does not relate directly to the present invention, description thereof if omitted here.

On the other hand, on the receiving side, the following procedure is implemented. Demodulating means 23 demodulates the multiplexed data from the transmitting side (step 5). Separating means 24 separates and extracts the PMT packet, using the packet identifier 0x02as a key (step 6). By decoding the PMT data, information indicating "program number 1: digital data PID is 0x91, non-hierarchically encoded data; program number 3: digital data PID is 0x92and 0x93, hierarchically encoded data" is obtained, and this information is stored in identification information storing means 26 (step 7).

A program selection is received from the operator via program selecting means 25, such as a remote control, channel buttons on a monitor, or the like (step 8). If the operator selects program number 1, the PID of the digital data to be reproduced is taken as "0x91" on the basis of the information from the identification information storing means 26, and hence the data is identified as being non-hierarchically encoded data.

In this embodiment, if the data is non-hierarchically encoded, then it is the first digital data, which is a low-resolution digital video signal, and therefore the program selecting means 25 instructs separating means 24 to separate packets having a PID of 0x91, and decoding instructing means 27 instructs low-resolution decoding means 28 to decode the first digital data 4 (step 9). Thereby, a sequential image signal of 720 effective horizontal pixels ×480 effective vertical scanning lines operating at 59.94 frames/second, for example, is displayed on image display means 31.

If the operator selects program number 3, then the PID of the digital data will be read as 0x92and 0x93on the basis of the information from identification information storing means 26, thereby identifying the data as hierarchically encoded data. In this case, since the data is hierarchically encoded, decoding instructing means 27 does not output a decoding instruction to low-resolution decoding means 28, and no reproduction and display is carried out.

In this way, in the digital data transmission method or digital data transmission device according to the present first embodiment, in a digital data transmission method whereby digital data for a plurality of programs is divided into packet units and a plurality of packets of this digital data and packets containing information relating to programs are transmitted by multiplexing, identification information for identifying when data is non-hierarchically encoded or hierarchically encoded is transmitted with the aforementioned data, thereby enabling the receiving side to identify correctly whether data is non-hierarchically encoded data or hierarchically encoded data, and allowing a low-resolution digital video signal to be reproduced correctly when the data is non-hierarchically encoded, by restricting in advance to low-resolution digital video signals, for example, and furthermore, enabling non-hierarchically encoded or hierarchically encoded digital data to be transmitted in program number units, thereby making it possible to increase the variety of programs transmitted.

Moreover, the digital data receiving device according to the first embodiment is able to identify when non-hierarchically encoded data is received, and it is therefore able to reproduce and display this data correctly.

(Second Embodiment)

Figure 7:
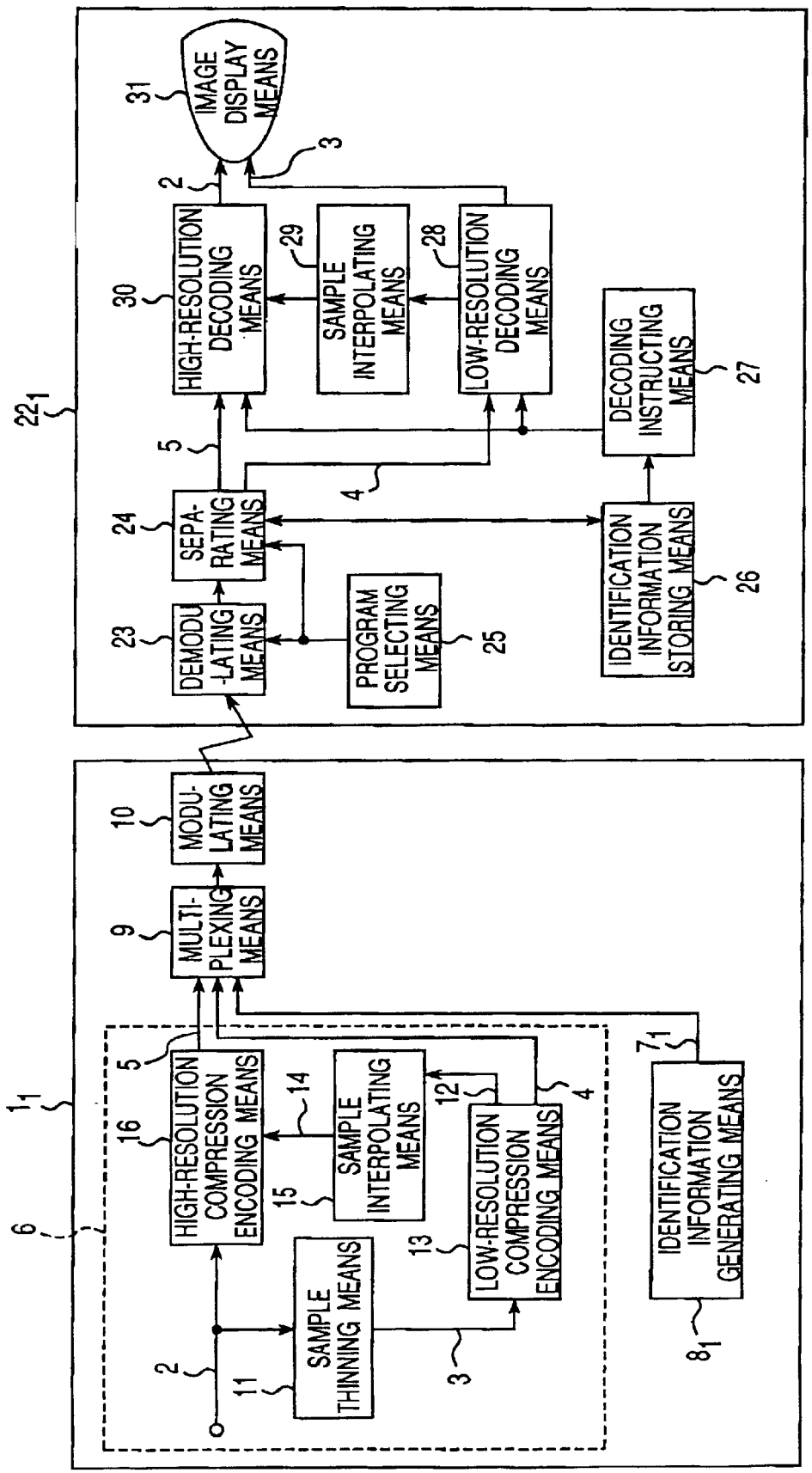
FIG. 7 is a compositional diagram of a system wherein a digital data transmission method according to a second embodiment of the present invention is applied.

FIG. 7 is a compositional diagram illustrating a system wherein a digital data transmission method according to a second embodiment of the present invention is applied; parts corresponding to the embodiment described above are labelled with the same reference numerals.

In the digital data transmission method according to this embodiment, a low-resolution digital video signal is generated by frequency scaling of an input digital video signal, first digital data obtained by encoding the low-resolution digital video signal and second digital data obtained by encoding the aforementioned input digital video signal is divided into packet units and transmitted by multiplexing with packets containing information relating to programs, and identification information for identifying whether data is the first digital data or the second digital data, as explained below, is described in the packets containing the information relating to programs.

Therefore, identification information generating means 8, in the digital data transmitting device $1_1$ generates identification information $7_1$ for identifying whether data is the first digital data 4 or the second digital data 5, rather than whether it is non-hierarchically encoded data or hierarchically encoded data, as described above. With this exception, the composition of the digital data transmitting device $1_1$ is the same as the foregoing embodiment.

Below, the process of transmitting this identification information with the packets containing information relating to programs is described, but leaving aside the identification information component, the composition of the transmission data in the second embodiment is basically the same as the data composition illustrated in FIG. 2.

In this embodiment, the following data composition is adopted in order that the first and second digital data 4, 5 can be identified.

Namely, in this embodiment, identification information for identifying whether data is first digital data 4 or second digital data 5 is described in the stream identifier of the program information descriptor in the PMT (program management table). FIG. 8 is a diagram illustrating a further data composition of a PMT (program management table) $20_2$, wherein the identification information indicating whether data is first digital data 4 or second digital data 5 is described in the stream identifier of the program information descriptor in the PMT.

The stream identifier contains an identifier indicating the type of video or audio encoded data (stream), and the PID of the corresponding stream is also registered as an elementary PID. Thereby, digital data transmitted individually for each PID can be described as either first digital data 4 or second digital data 5. In FIG. 8, the stream identifier code value 0x80 corresponds to the first digital data 4 and the code value 0x81 corresponds to the second digital data 5, but other code values may of course also be used, provided that both digital data 4, 5 can be identified. In this way, identification information for identifying the first digital data and second digital data is described in the stream identifier of the PMT (program management table) and transmitted.

As illustrated in FIG. 7 above, the digital data receiver device 22, on the other hand, comprises: demodulating means 23 for demodulating the first and second digital data 4, 5 and information containing identification information; program selecting means 25 for receiving program selection commands from an operator (user) and giving instructions to demodulating means 23 and separating means 24; the aforementioned separating means 24 for separating and extracting digital data selected by program selecting means 25, on the basis of identification information; identification information storing means 26 for storing identification information separated by separating means 24; decoding instructing means 27 for giving a reproduction instruction to decoding means 28, 30 on the basis of identification information from identification information storing means 26; low-resolution decoding means 28 for decoding the first digital data 4 separated and extracted by separating means 24 and outputting this data in the form of a low-resolution digital video signal 3; sample interpolating means 29 for generating an up-sampling signal by up-sample processing of a predicted image signal from low-resolution decoding means 28; high-resolution decoding means 30 for decoding the second digital data 5 separated and extracted by separating means 24 and outputting this data as a high-resolution digital video signal 2; and image display means 31 for displaying the digital video signals from decoding means 28 and 30. A normal image data receiving device requires further components in addition to these, for example, a decoding section for decoding sound data, or the like, but since these components do not relate directly to the present invention, description thereof is omitted here.

Figure 9A:
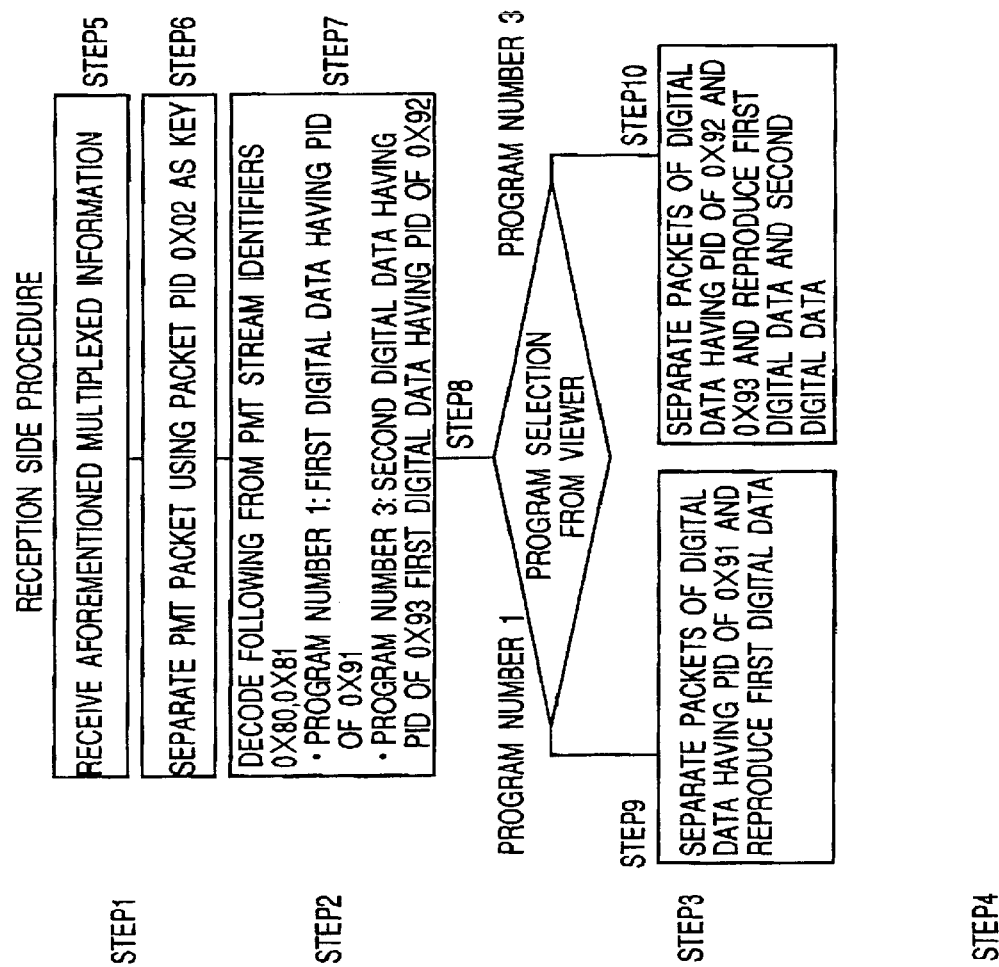
FIG. 9(A) and FIG. 9(B) show flowcharts corresponding to those in FIG. 6 in the case of the data composition in FIG. 8.
Figure 9B:
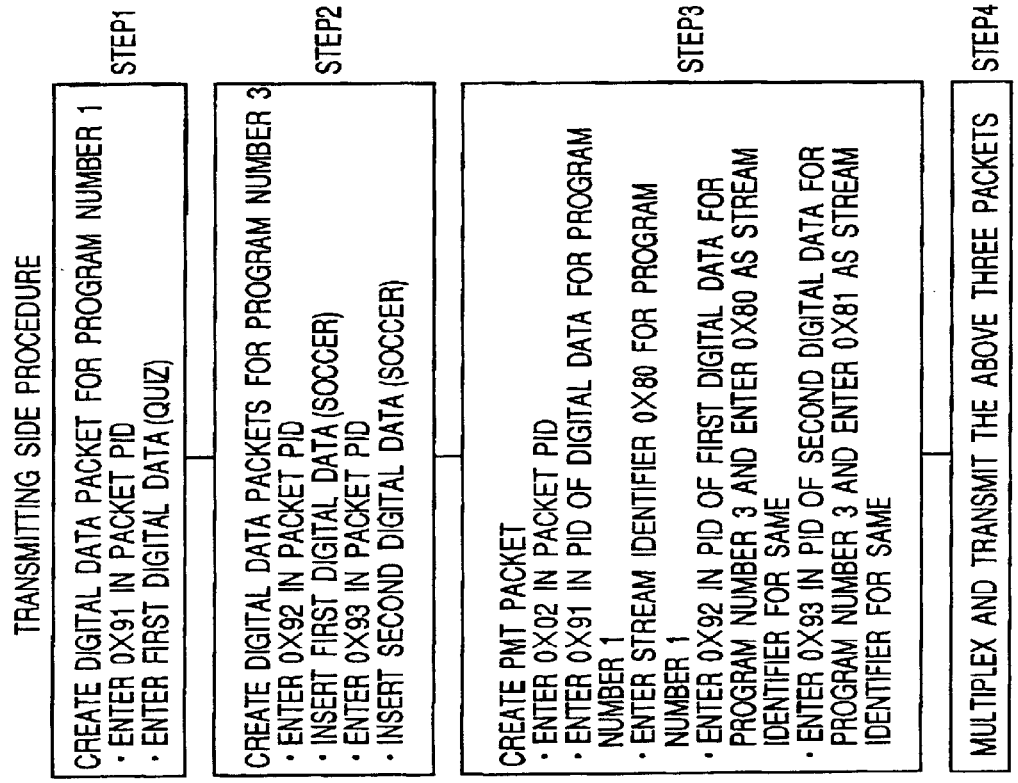
Figure 10:
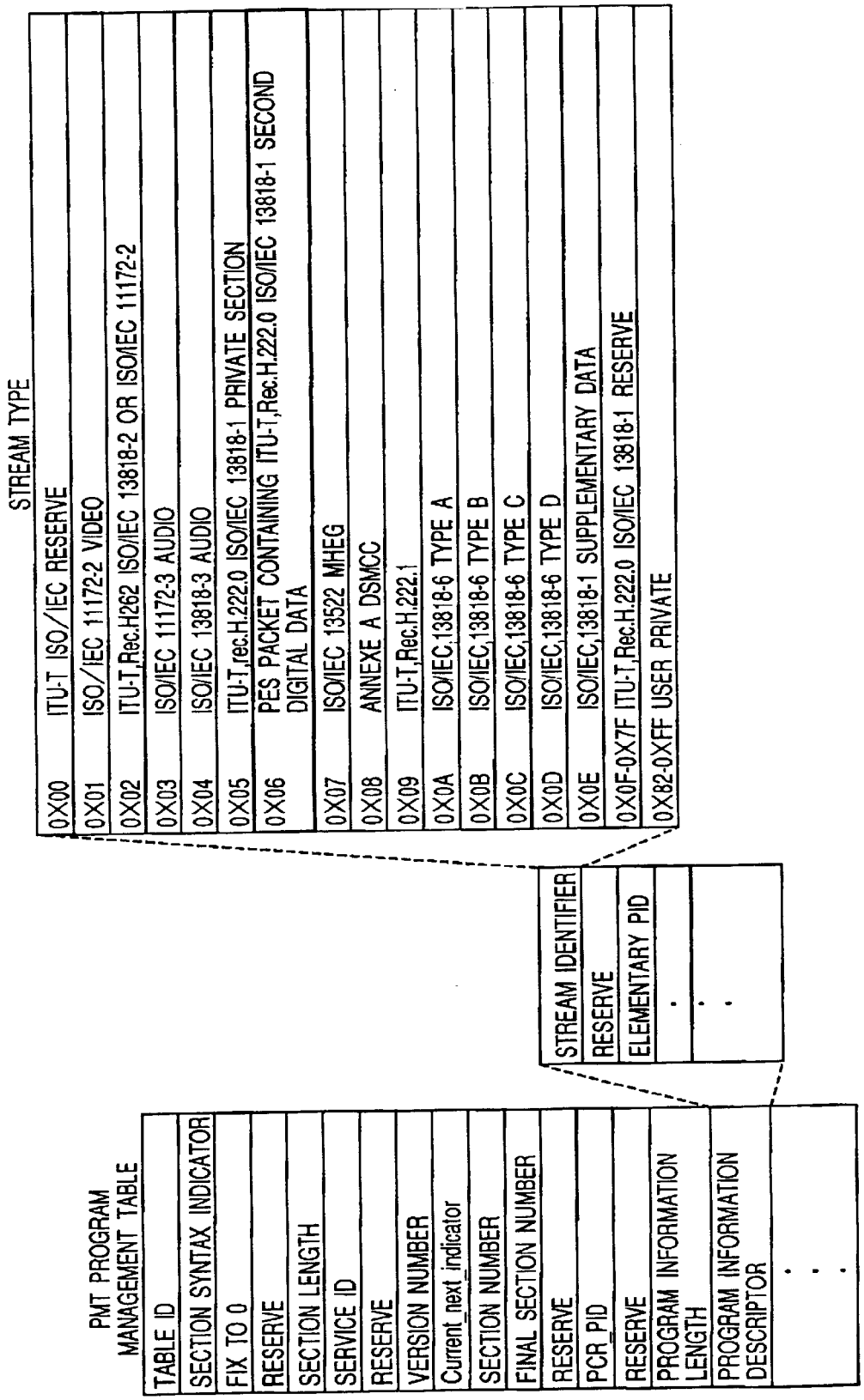
FIG. 10 is a diagram illustrating a further data composition of a stream identifier in a PMT (program management table).

Next, the operation of the transmitting side and receiving side of the embodiment having the foregoing composition is described on the basis of the flowcharts in FIG. 9(A) and FIG. 9(B).

Here, the program numbers are limited to program number 1 and program number 3, similarly to the previous embodiment, and it is assumed that these two program numbers 1, 3 are multiplexed on the basis of a single frequency band. Moreover, it is supposed that the program in program number 1 is non-hierarchically encoded and constituted by the first digital data, the program name being "quiz", and the program in program number 3 is hierarchically encoded and constituted by the second digital data, its program name being "soccer".

The following procedure is implemented on the transmitting side. Firstly, a packet of digital data for program number 1 is created (step 1). A packet identifier PID of "0x91" is attached to the leading bit of a packet, and digital data (quiz) is appended thereafter to form a packet of uniform size. Here, the PID is taken as "0x91", but any PID may be used, provided that it allows the packet to be distinguished from other packets.

Next, packets of digital data for program number 3 are created (step 2). A packet identifier PID of "0x92" is attached to the leading bit of a packet, and first digital data (soccer) is appended thereafter, and "0x93" is attached to the leading of a packet and second digital data (soccer) is appended thereafter, such that packets of uniform size are formed. Here, the PID is taken as "0x92" and "0x93", but other PID values may be used, provided that they enable a packet to be distinguished from other packets.

Thereupon, a PMT packet is created (step 3). "0x02" is entered as a packet identifier PID at the header of the packet, "0x91" is entered in the first digital data PID for program number 1, "0x80" is designated in the stream identifier for program number 1 as identification information which indicates that the data is first digital data, "0x92" is entered in the first digital data PID for program number 3, "0x80" is designated in the stream identifier as identification information indicating that the data is first digital data, "0x93" is entered as the second digital data PID for program number 3, and "0x81" is designated as identification information indicating that the data is second digital data.

These various packets are multiplexed and transmitted (step 4). In other words, the aforementioned packets are set to a uniform size and are then multiplexed and transmitted. Usually, error correction is added and transmission is conducted by QPSK modulation or QAM modulation, but since this does not relate directly to the present invention, description thereof is omitted here.

On the other hand, at the receiving side, the following procedure is implemented. Demodulating means 23 demodulates the multiplexed data from the transmitting side (step 5). Separating means 24 separates and extracts the PMT packet using the packet identifier "0x02" as a key (step 6). By decoding the PMT data, information indicating "program number 1: digital data PID=0x91, first digital data 4; program number 3: digital data PID 0x92and 0x93, first digital data 4 and second digital data 5, respectively" is obtained, and this information is stored in the identification information storing means 26 (step 7).

Program selection is received from the operator via program selecting means 25, such as a remote control, channel buttons on a monitor, or the like (step 8). If the operator selects program number 1, the PID of the digital data to be reproduced is taken as "0x91 " on the basis of the information from the identification information storing means 26, and hence the data is identified as being first digital data 4. Program selecting means 25 instructs separating means 24 to separate packets having a PID of "0x91", and decoding instructing means 27 instructs low-resolution decoding means 28 to decode the first digital data 4 (step 9). Thereby, a sequential scanning signal operating at, for example, 720 effective horizontal pixels×480 effective vertical scanning lines and 59.94 frames/second is displayed on image display means 31.

If the operator selects program number 3, then the PID of the digital data will be read as 0x92and 0x93on the basis of the information from identification information storing means 26, thereby identifying the data as first digital data 4 and second digital data 5, respectively. Program selecting means 25 instructs separating means 24 to separate packets having a PID of 0x92and 0x93, and decoding instructing means 27 instructs low-resolution decoding means 28 to decode the first digital data 4, whilst also instructing high-resolution decoding means 30 to decode the second digital data 5 (step 10). Thereby, a sequential scanning signal operating at, for example, 1280 effective horizontal pixels ×720 effective vertical scanning lines and 59.97 frames/second is displayed on image display means 31.

As described above, in a digital data transmission method or digital data transmission device according to the second embodiment of the present invention, whereby digital data for a plurality of programs is divided respectively into packet units, and this plurality of packets of digital data and packets containing information relating to programs are multiplexed and transmitted, in addition to transmitting, as the digital data for the plurality of programs, first digital data 4 obtained by encoding a sequential scanning signal operating at 720 effective horizontal pixels ×480 effective vertical scanning lines and 59.94 frames/second, for example, and second digital data 5 obtained by encoding a sequential scanning signal operating at 1280 effective horizontal pixels ×720 effective vertical scanning lines and 59.94 frames/second, identification information for identifying whether the digital data constituting a program is the first digital data 4 or the second digital data 5 is also transmitted in a PMT (program management table) 20 that indicates which packets are used to transmit which programs, and therefore both the first digital data 4 and the second digital data 5 can be reproduced correctly on the receiver side and the variety of programs transmitted can be increased.

Furthermore, since the digital data reception device according to this second embodiment comprises demodulating means 23 for demodulating the first digital data 4, the second digital data 5 and information containing identification information for identifying both digital data 4, 5, separating means 24 for separating and extracting digital data corresponding to a selection operation, on the basis of the identification information and the aforementioned selection operation, low-resolution decoding means 28 for decoding the first digital data 4 separated and extracted by separating means 24 and outputting this data in the form of a low-resolution digital video signal 3, and high-resolution decoding means 30 for decoding the second digital data 5 separated and extracted by separating means 24 and outputting this data as a high-resolution digital video signal 2, both the first digital data 4 and the second digital data 5 can be reproduced and displayed correctly. The identification information for identifying the first digital data 4 and the second digital data 5 may be designated as a code signifying a PES (Packetized Elementary Stream) of code value 0x06, which indicates private data in the stream identifier of the PMT (program management table), or it may be designated as a code signifying a private section of code value 0x05, as shown in FIG. 11, or it may be designated as code value 0x0F, as illustrated in FIG. 12.

(Third Embodiment)

FIG. 13 is a compositional diagram of transmission data in a third embodiment of the present invention. Parts corresponding to FIG. 2 are given the same reference numerals. With the exception of the component relating to identification information, the composition of the transmission and reception systems is the same as in the second embodiment illustrated in FIG. 2.

In the foregoing embodiments, non-hierarchically encoded data and hierarchically encoded data were multiplexed and transmitted for each program number, but in the present embodiment, the non-hierarchically encoded first digital data 4 and the hierarchically encoded first and second digital data 4, 5 are multiplexed and transmitted for each program, as indicated in an EIT (event information table) $21_1$, rather than for each program number.

Therefore, in contrast to the second embodiment described above, wherein identification information for identifying the first and second digital data is described in the stream identifier of the PMT (program management table), in the present embodiment, it is possible to describe a component type indicating the constituent elements of a program in the EIT (event information table) $21_1$, which gives program contents, and a code identifying whether data is the first digital data 4 or the second digital data 5 is described in the component type.

FIG. 14 shows an EIT (event information table) 21₁ which shows program allocations indicating the location of the aforementioned component type. The component type is located within a component identifier, which is one descriptor contained in the EIT (event information table), and it has an 8-bit structure.

FIG. 15 is a code allocation example for component type in the case of the second digital data 5, and FIG. 16 is a code allocation example for component type in the case of the first digital data 4. FIG. 15 and FIG. 16 give one example of code allocations, and any other codes may be used, provided that they enable data to be identified as either first digital data 4 or second digital data 5.

Next, a transmission and reception operation in the third embodiment is described.

Firstly, "0x12" is entered as a PID at the head of an EIT packet. Thereupon, the following information, which is illustrated in FIG. 13, is stored in the region corresponding to program number 1.

Start time: 19:00

Program name: Baseball a

Component type: 0x01 (code indicating first digital data 4)

0x21 (code indicating second digital data 5)

Start time: 20:00

Program name: Quiz

Component type: 0x01 (code indicating first digital data 4)

Start time: 21:00

Program name: Foreign film

Component type: 0x02(code indicating first digital data 4) 0x22 (code indicating second digital data 5)

Thereupon, the following information, which is illustrated in FIG. 12, is stored in the region corresponding to program number 3.

Start time: 19:00

Program name: Baseball a

Component type: 0x01 (code indicating first digital data 4)

Start time: 20:00

Program name: Soccer

Component type: 0x02(code indicating first digital data 4) :0x22 (code indicating second digital data 5)

Start time: 21:00

Program name: Baseball b

Component type: 0x02(code indicating first digital data 4) :0x22 (code indicating second digital data 5)

Start time: 22:00

Program name: News Component type: 0x01 (code indicating first digital data 4)
:0x21 (code indicating second digital data 5)

The aforementioned EIT is transmitted by multiplexing it with the digital data for program number 1, the digital data for program number 3, and the PMT packet describing the PIDs of the digital data for each program number.

The operation of the digital data reception device illustrated in FIG. 7 is as follows.

The aforementioned multiplexed data transmitted from the transmitting side is demodulated by demodulating means 23, PMT packets are separated by separating means 24 using packet identifier PID 0x02as a key, and the EIT packets are separated and extracted using packet identifier PID 0x12as a key.

Therefore, by decoding the PMT data, it can be recognised that "the PID of digital data for program number 1 is 0x91" and that "the PID of digital data for program number 3 is 0x92and 0x93", and furthermore, the component identifiers in the EIT can be defined according to the PIDs of the digital data for each program number as defined in the PMT. By decoding this, then supposing that the current time is 20:00–21:00, for example, information indicating that "the digital data for program number 1 is the first digital data 4, and the digital data for program number 3 is the first digital data and the second digital data 5" will be obtained, and this information will be stored in identification information storing means 26.

Furthermore, if a program selection is received from the operator and program number 1 is selected, the PID of the digital data to be reproduced will be recognized as 0x91, on the basis of information from identification information storing means 26, thereby identifying the digital data as the first digital data 4. Program selecting means 25 instructs separating means 24 to separate packets having a PID of 0x91, and decoding instructing means 27 instructs low-resolution decoding means 28 to decode the first digital data 4.

If, on the other hand, the operator selects program number 3, then the PID of the digital data is recognised as 0x92and 0x93, on the basis of the information from identification information storing means 26, thereby identifying the digital data to be the first and second digital data 4, 5 Program selecting means 25 instructs separating means 24 to separate packets having a PID of 0x92and 0x93, and decoding instructing means 27 instructs low-resolution decoding means 28 to decode the first digital data 4, whilst also instructing high-resolution decoding means 30 to decode the second digital data 5.

Charge information may also be added to the descriptor in the EIT (event information table) 21₁ shown in FIG. 14, such that charge information can be understood at the receiver side. For example, it is possible to apply a charge depending on the image resolution, such that the first digital data (PID: 0x91or 0x92), which is a low-resolution digital video signal, is free of charge, but when the second digital data (PID: 0x93), which is a high-resolution digital video signal, is added, a charge is incurred.

As described above, in the third embodiment, when digital data for a plurality of programs is divided respectively into packet units and this plurality of packets of digital data is transmitted by multiplexing with packets containing information relating to programs, identification information for identifying whether the digital data constituting a program is the first digital data 4 or the second digital data 5 is transmitted as a descriptor in an event information table 21₁, which shows program contents, and therefore both the first digital data 4 and the second digital data 5 can be reproduced correctly at the receiver side, thereby allowing increased freedom in the composition of programs to be transmitted, such that, for instance, low-resolution digital data is used for news programs and high-resolution digital data is used for sports programs.

Moreover, in the present embodiment, identification information for identifying the first digital data 4 and the second digital data 5 is described in a component identifier of the EIT (event information table) 21₁, which shows programs contents, but as a further embodiment of the present invention, the identification information may also be described in a CSSM packet of a channel service allocation table, which shows program contents.

Figure 17:
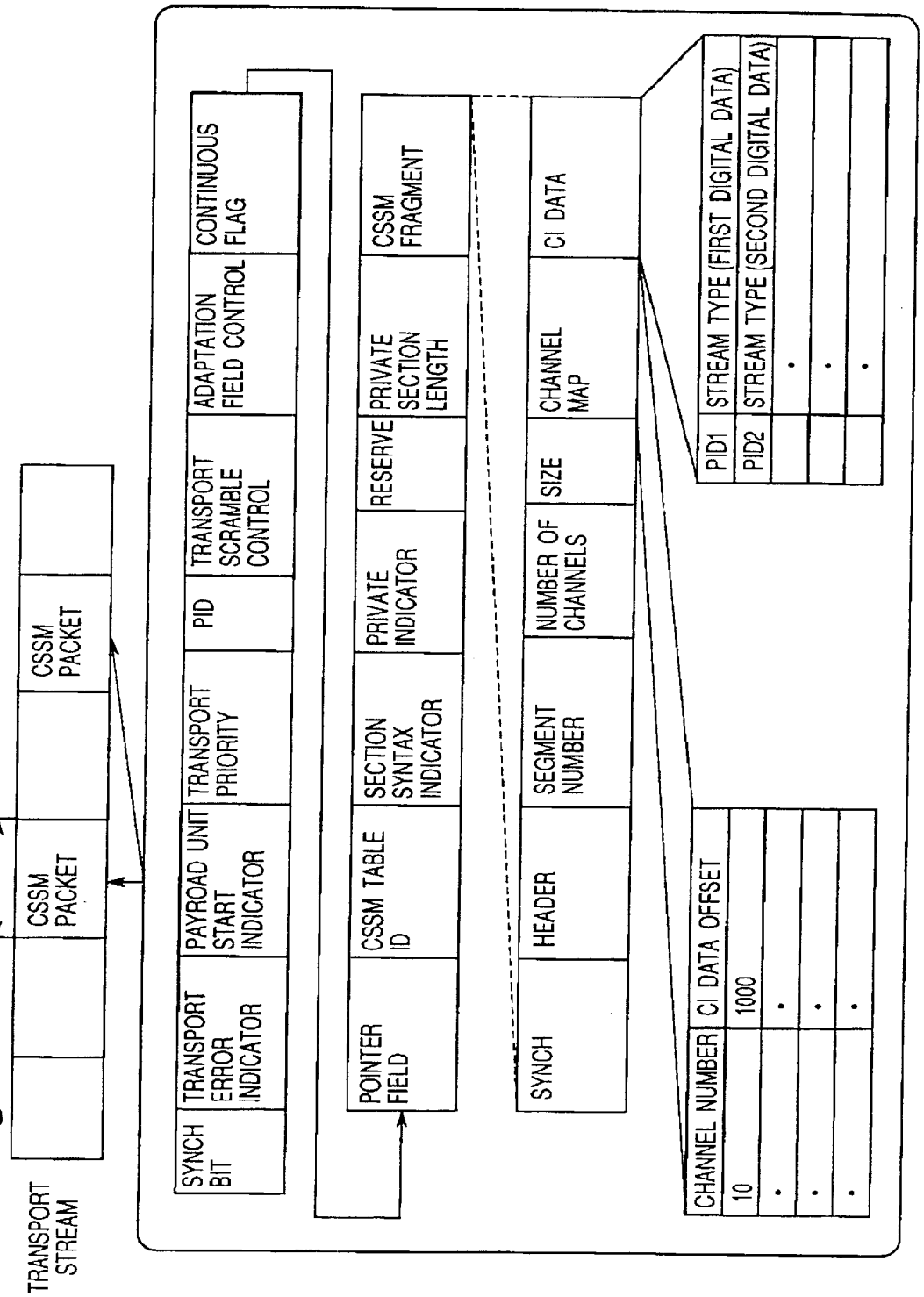
FIG. 17 is a diagram illustrating a data composition of a GSSM packet in a channel service allocation table.

FIG. 17 is a diagram illustrating the contents of a CSSM packet in a channel service allocation table, wherein a CSSM fragment is described within the CSSM packet. The channel map contains the channel number (program number) and also a CI data offset. This CI data offset is a data offset for CI data corresponding to the aforementioned channel number.

Figure 18:
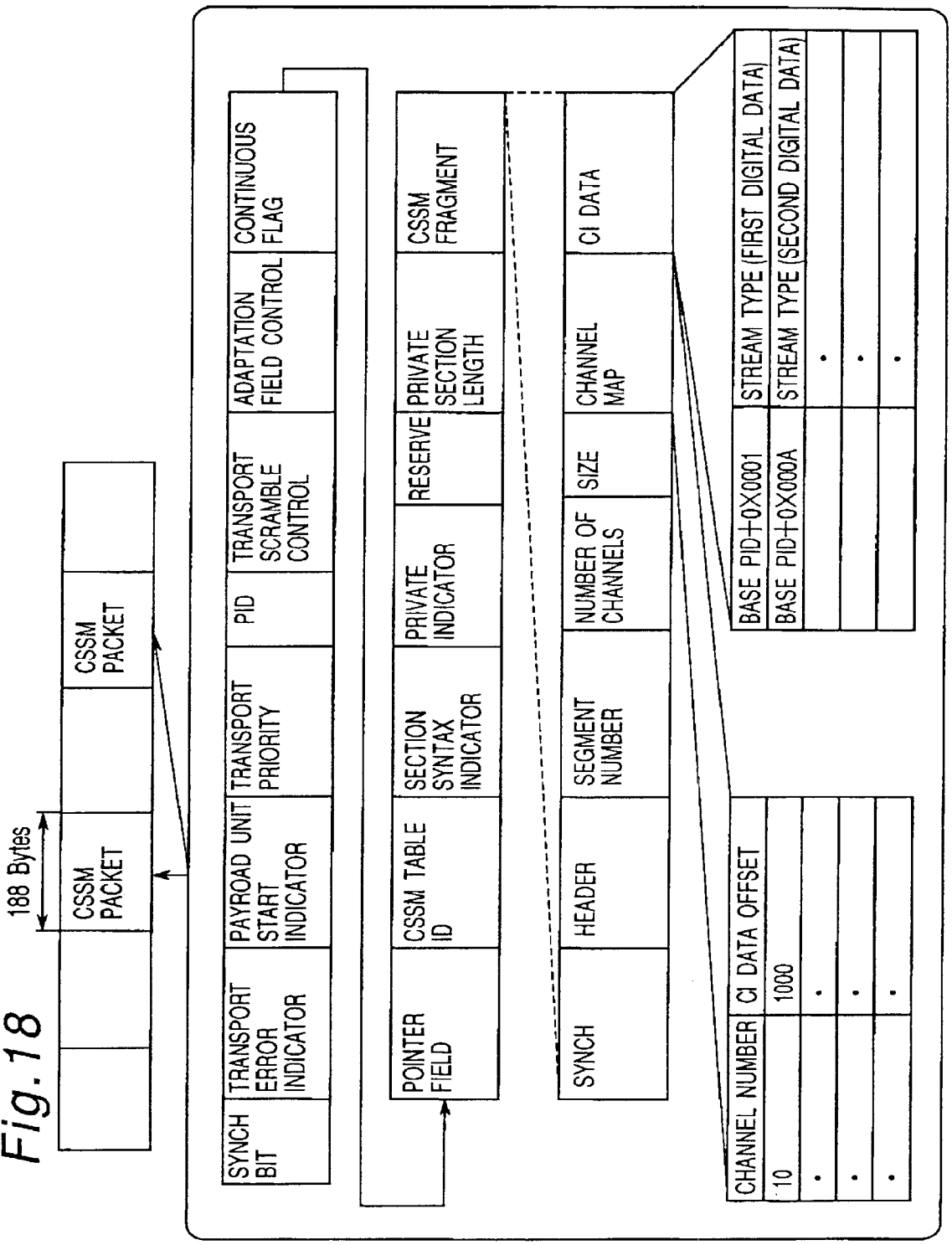
FIG. 18 is a diagram illustrating a further data composition of a CSSM packet in a channel service allocation table.

In the CI data, a PID list table is described. The PID list table contains stream types which distinguish which stream each PID is located in, in other words, whether each PID indicates the first digital data 4 or the second digital data 5, and this table shows corresponding program information. Thereby, it is possible to identify the stream type of the first digital data 4 and second digital data 5, and each PID stream can be made to correspond to a channel number (program number) and a PID of the first and second digital data 4, 5. Moreover, as shown in FIG. 18, if the PID list expresses the PID of the first digital data 4 as base PID+0x000J (where H is a positive integer) and the PID of the second digital data 5 as base PID+0x000K (where K is a positive integer other than J), then it is possible to create a connection using the base PID alone.

(Fourth Embodiment)

Figure 19:
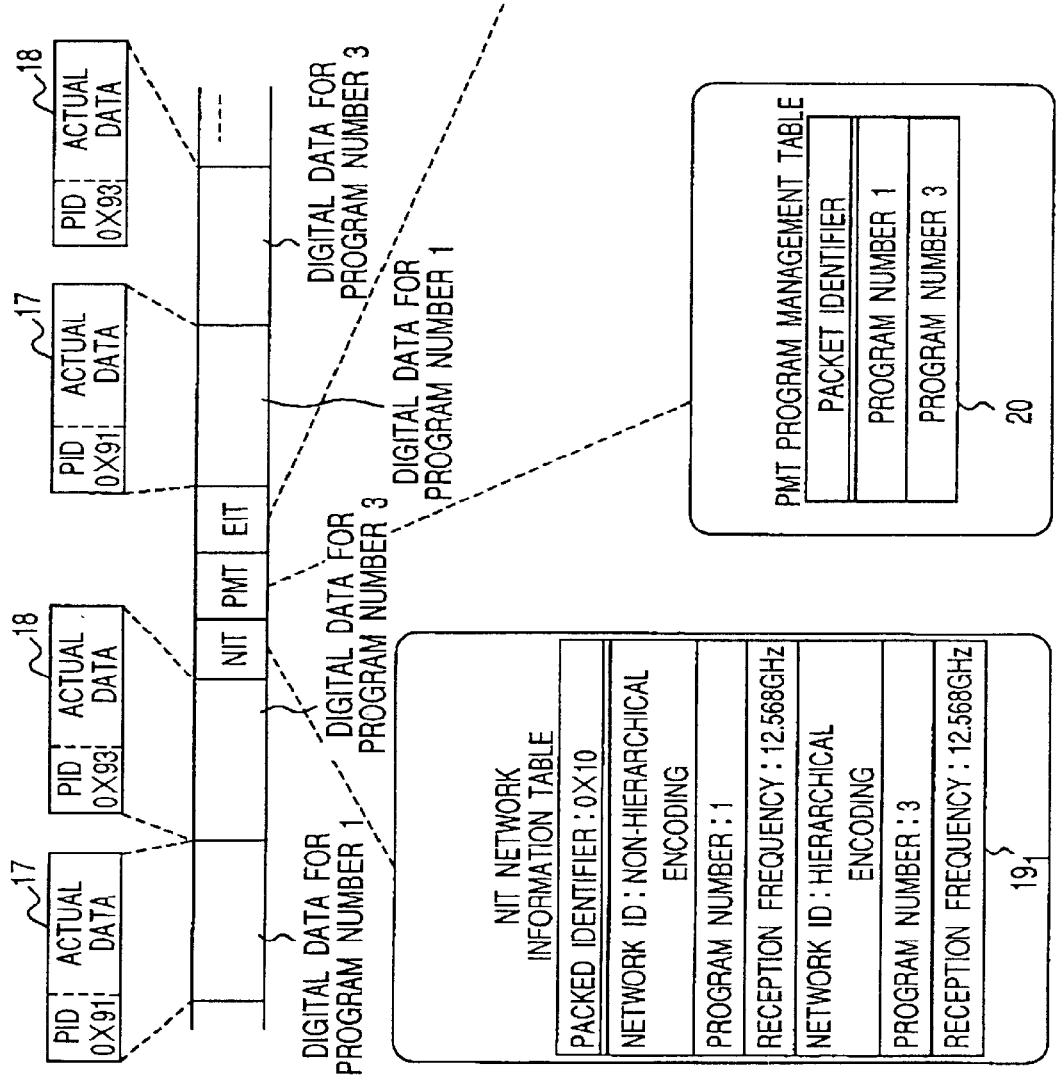
FIG. 19 is a diagram illustrating the composition of transmission data according to a fourth embodiment of the present invention.

FIG. 19 is a compositional diagram of transmission data according to a fourth embodiment of the present invention. Parts which correspond to FIG. 2 are given the same reference numerals. With the exception of the component relating to identification information, the composition of the transmission and reception systems is the same as in the first embodiment in FIG. 1.

In the first embodiment described above, identification information for identifying whether data is non-hierarchically encoded or hierarchically encoded was designated in the system control identifier of the PMT (program management table) 20₁, whereas in the present embodiment, a network ID for identifying the network can be designated in an NIT (network information table) 19₁.

FIG. 20 is diagram of a data composition in an NIT (network information table) 19₁ showing the location of the aforementioned network ID, and FIG. 21 is an example of code allocations for the network ID. Here, the code for non-hierarchical encoding is taken as 0x0001 and the code for hierarchical encoding is taken as 0x0002, but other codes can be used, provided that they enable non-hierarchical encoding and hierarchical encoding to be identified.

Next, transmission and reception operations according to the present embodiment will be described.

On the transmitting side, data is transmitted by the following procedure. Firstly, "0x10" is entered as a PID at head of an NIT packet. Thereupon, the following data, which is illustrated in FIG. 19, is stored in the NIT as information for program number 1.

Network ID: 0x0001 (code indicating non-hierarchical encoding)
Program number: 1
Reception frequency: 12.598 GHz
The following data is stored in the NIT as information for program number 3.
Network ID: 0x002 (code indicating hierarchical encoding)
Reception frequency: 12.568 GHz Thereupon, this NIT is multiplexed and transmitted with digital data for program number 1, digital data for program number 3 and a PMT packet which describes the PIDs for the digital data for each program number.

Moreover, the operation of the digital data reception device illustrated in FIG. 1 is as shown below.

The aforementioned multiplexed data transmitted from the transmitting side is decoded by decoding means 23, PMT packets are separated by separating means 24, using the packet identifier PID "0x02" as a key, and the NIT packets are separated and extracted using the packet identifier PID "0x10" as a key. By decoding the PMT data, it is recognized that "the PID for the digital data for program number 1 is 0x91" and that "the PID for the digital data for program number 3 is 0x92 and 0x93", and furthermore, by decoding the NIT data, information indicating that "the digital data for program number 1 is non-hierarchically encoded data and the digital data for program number 3 is hierarchically encoded data" is obtained, and this information is stored in identification information storing means 26.

A program selection is received from an operator via program selecting means 25, such as a remote control, channel buttons on a monitor, or the like. If the operator selects program number 1, then the PID of the digital data to be reproduced is recognized as 0x91 on the basis of the information from identification information storing means 26, thereby identifying the data as non-hierarchically encoded data. The program selecting means 25 instructs separating means 24 to separate packets having a PID of 0x91, and the decoding instructing means 27 instructs the low-resolution decoding means 28 to decode the first digital data 4. Thereby, a sequential scanning signal operating at 720 effective horizontal pixels ×480 effective vertical scanning lines and 59.94 frames/second is displayed on image display means 31.

If the operator selects program number 3, then the PID of the digital data is recognised to be 0x92 and 0x93 on the basis of the information from identification information storing means 26, thereby identifying the data as hierarchically encoded data, and since the data is hierarchically encoded, decoding instructing means 27 does not output a decoding command to low-resolution decoding means 28 and no image is reproduced and displayed in this case.

As described above, in the digital data transmission method or digital data transmission device according to the fourth embodiment, whereby digital data for a plurality of programs is divided respectively into packet units and this plurality of packets of digital data is multiplexed and transmitted with packets containing information relating to programs, identification information for identifying whether data is non-hierarchically encoded or hierarchically encoded is transmitted additionally in an NIT (network information table) which indicates which program is transmitted in which packets, thereby enabling the receiving side to identify correctly whether data is non-hierarchically encoded or hierarchically encoded, and if it is non-hierarchically encoded data, in the present embodiment, the data forms a low-resolution digital video signal, and therefore the signal can be reproduced correctly and non-hierarchically encoded digital data or hierarchically encoded digital data can be transmitted separately on each network, in other words, on each transponder, thereby increasing the possible variety of programs transmitted.

(Fifth Embodiment)

Figure 22:
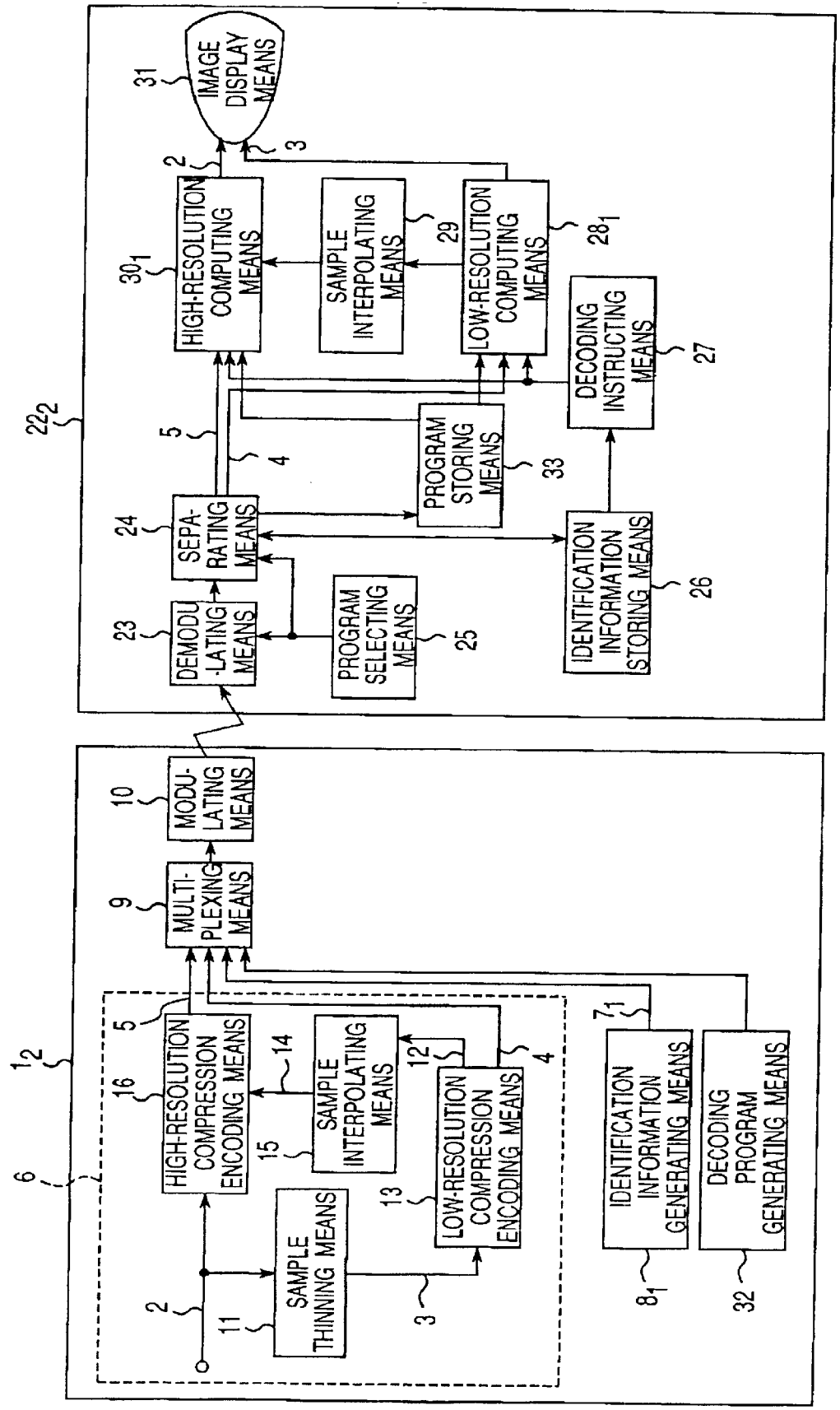
FIG. 22 is a compositional diagram of a system wherein a digital data transmission method according to a fifth embodiment of the present invention is applied.

FIG. 22 is a compositional diagram showing a system wherein a digital data transmission method according to a fifth embodiment of the present invention is applied. Parts which correspond to the second embodiment illustrated in FIG. 7 are labelled with the same reference numerals.

In this embodiment, the transmitting side is provided with decoding program generating means 32 for generating a first decoding program containing an algorithm for decoding first digital data 4 which has been compressed and encoded by low-resolution compression encoding means 13 and a second decoding program containing an algorithm for decoding second digital data 5 which has been compressed and encoded by high-resolution compression encoding means 16. The receiving side, on the other hand, comprises program storing means 33 for storing received and demodulated decoding programs and, in place of the high-resolution decoding means 30 and low-resolution decoding means 28 in the second embodiment described above, it comprises high-resolution computing means $30_1$ and low-resolution computing means $28_1$ for carrying out respective decoding operations on the basis of decoding programs supplied by program storing means 33. In the present embodiment, identification information for identifying the first and second digital data 4, 5 is transmitted by being described in the stream identifier of the PMT (program management table), similarly to the second embodiment described above, and furthermore, identification information for the first and second decoding programs is described in the system control identifier of the PMT (program management table). One example of code allocations in this system control identifier is shown in FIG. 23.

Next, the operations on the transmitting side and receiving side according to the present embodiment having the foregoing composition will be described with reference to the flowcharts in FIG. 24(A) and FIG. 24(B).

Here also, the number of programs is limited to two, namely, program number 1 and program number 3, similarly to the foregoing embodiments, and it is assumed that the two program numbers 1, 3 are multiplexed on the basis of a single frequency band. Moreover, it is supposed that the program in program number 1 is non-hierarchically encoded and is constituted by first digital data 4, the program name being "quiz", whilst the program in program number 3 is hierarchically encoded and is constituted by first and second digital data 4, 5, the program name being "soccer".

The following procedure is implemented on the transmitting side. Firstly, a packet of digital data for program number 1 is created (step 1). A packet identifier PID, "0x91", is attached to the head of a packet, and digital data (quiz) is appended thereafter to create a packet of uniform size. Here, the PID has been taken as "0x91", but any PID may be used, provided that it allows the packet to be distinguished from other packets.

Next, packets of digital data for program number 3 are created (step 2). A packet identifier, "0x92", is attached to the head of a packet, and first digital data (soccer) is appended thereafter, and a packet identifier, "0x93" is attached to the head of a packet and second digital data (soccer) is appended thereafter, thus creating packets of uniform size. Here, the PID has been taken as 0x92 and 0x93, but any PID may be used, provided that it allows the packets to be distinguished from other packets.

Thereupon, first and second decoding program data packets are created (step 3). A packet identifier PID of "0x95" is attached to the head of a packet, and first decoding program data is added thereafter to create a packet of uniform size. Furthermore, a packet identifier PID of "0x96" is attached to the head of a packet and second decoding program data is added thereafter to create a packet of uniform size, also. Here, the PIDs are taken as 0x95and 0x96, but provided that a packet can be distinguished from other packets, any PID may be used in creating a PMT packet (step 4). "0x02" is entered at the head of a packet as a packet identifier PID, "0x91" is entered as the PID for first digital data for program number 1, "0x80" is designated as identification information in the-stream identifier for program number 1, indicating that the data is the first digital data, "0x92" is entered as the PID for the first digital data for program number 3, "0x80" is entered as identification information in the stream identifier for program number 3, indicating that the data is the first digital data, "0x93" is entered as the PID of the second digital data for program number 3, and "0x81" is designated as identification information in the stream identifier for program number 3, indicating that the data is second digital data.

Thereupon, a PMT packet of decoding program data is generated (step 5). "0x95" is entered as a PID for the first decoding program data, "0x03" is designated as first decoding program data in the lower 8 bits of the system control identifier for the first decoding program data, "0x96" is entered as the PID of the second decoding program data, and "0x04" is designated as second decoding program data in the lower 8 bits of the system control identifier for the second decoding program data.

These packets are multiplexed and transmitted (step 6). In other words, the aforementioned packets are set to a uniform size, and are multiplexed and then transmitted. Normally, error correction is added and transmission is conducted by QPSK modulation or QAM modulation, or the like, but since this does not relate directly to the present invention, description thereof is omitted here.

At the receiving side, on the other hand, the following procedure is implemented. Demodulating means 23 demodulates the multiplexed data from the transmitting side (step 7). Separating means 24 separates and extracts the PMT packet using the packet identifier PID 0x02as a key (step 8). By decoding the PMT data, information indicating "program number 1: digital data PID=0x91, first digital data 4; program number 3: digital data PID=0x92 and 0x93, first digital data 4 and second digital data 5, respectively" is obtained, and information indicating that "the PID of the decoding program data for the first digital data 4 is 0x95, and the PID of the decoding program data for the second digital data is 0x96" is also obtained (step 9), this decoding program data being stored in program storing means 33 (step 10).

A program selection is received from the operator via program selecting means 33, such as a remote control, channel buttons on a monitor, or the like (step 11). If the operator selects program number 1, the PID of the first digital data 4 which is to be reproduced is identified as 0x91, and the PID of the first decoding program for decoding the first digital data 4 is identified as 0x95. Program selecting means 25 instructs separating means 24 to separate packets having a PID of 0x91 and packets having a PID of 0x95, and decoding instructing means 27 instructs low-resolution computing means 28, and program storing means 33 to read out the first decoding program and decode the first digital data 4 (step 12). Thereby, a sequential scanning signal operating at, for example, 720 effective horizontal pixels×480 effective vertical scanning lines and 59.94 frames/second is displayed on image display means 31.

If the operator has selected program number 3, the PID of the digital data to be reproduced is recognized as 0x92 and 0x93, the PID of the decoding program for decoding the first digital data is recognized as 0x95, and the PID of the second decoding program for decoding the second digital data is identified as 0x96. Program selecting means 25 instructs separating means 24 to separate packets having a PID of 0x92 or 0x93 and packets having a PID of 0x95or 0x96, and decoding instructing means 27 instructs low-resolution computing means 28, and program storing means 33 to read out the first decoding program and decode the first digital data, whilst also instructing high-resolution computing means $30_1$ and program storing means 33 to read out the second decoding program and decode the second digital data 5 (step 13). Thereby, a sequential scanning signal operating at, for example, 1280 effective horizontal pixels×720 effective vertical lines and 59.97 frames/second is displayed on image display means 31.

In this way, in the present fifth embodiment, when digital data for a plurality of programs is divided respectively into packet units and this plurality of packets of digital data is multiplexed and transmitted with packets containing information relating to programs, in addition to transmitting first and second digital data 4, 5 as the digital data for the aforementioned programs, and decoding program data for decoding the first and second digital data, identification information for identifying whether the data is first digital data 4 or second digital data 5 is also transmitted, and therefore both the first digital data 4 and the second digital data 5 can be reproduced correctly as the receiving side, and the variety of programs transmitted can be increased. Moreover, since the decoding programs can be altered at the transmitting side, it is possible to adapt readily to technological advances, and the like.

In the present fifth embodiment, either of the first and second digital data 4, 5 are decoded on the basis of decoding programs, but it is also possible for a decoding program for either one of the digital data only to be transmitted, the one digital data being constructed by computing means at the receiving side, and the other digital data being constructed by decoding means.

In this embodiment, information for identifying the first and second decoding programs is described in the system control identifier of the PMT (program management table), but as a further embodiment, it may also be described in the stream identifier of the PMT (program management table). Also, in the fifth embodiment, the identification information is described in the stream identifier of the PMT (program management table), similarly to the second embodiment described above, but the identification information may also be described in the EIT (event information table), similarly to the third embodiment.

(Sixth Embodiment)

FIG. 25 is a compositional diagram showing a system wherein a digital data transmission method according to a sixth embodiment is applied. Parts corresponding to FIG. 7 are labelled with the same reference numerals.

In the present embodiment, similarly to the third embodiment described above, identification information for identifying the first and second digital data is designated in the EIT (event information table), and the transmitting side is further provided with program table information generating means 34 for generating program table information, whilst the receiving side is provided with program table storing means 35 for storing program table information from the EIT (event information table), program table creating means 36 for processing the program table information from program table storing means 35 into visible information, and signal synthesizing means 37 for synthesizing the outputs from high-resolution and low-resolution decoding means 30, 28 and the output from program table creating means 36.

The transmission data in this sixth embodiment has a similar composition to the third embodiment described above, and on the transmitting side 6, first digital data 4, second digital data 5, program table information and identification information are multiplexed by multiplexing means 9, modulated by modulating means 10 and then transmitted. The program table information and identification information for each program is described in EIT (event information table) packets, similarly to the third embodiment described above.

Figure 26B:
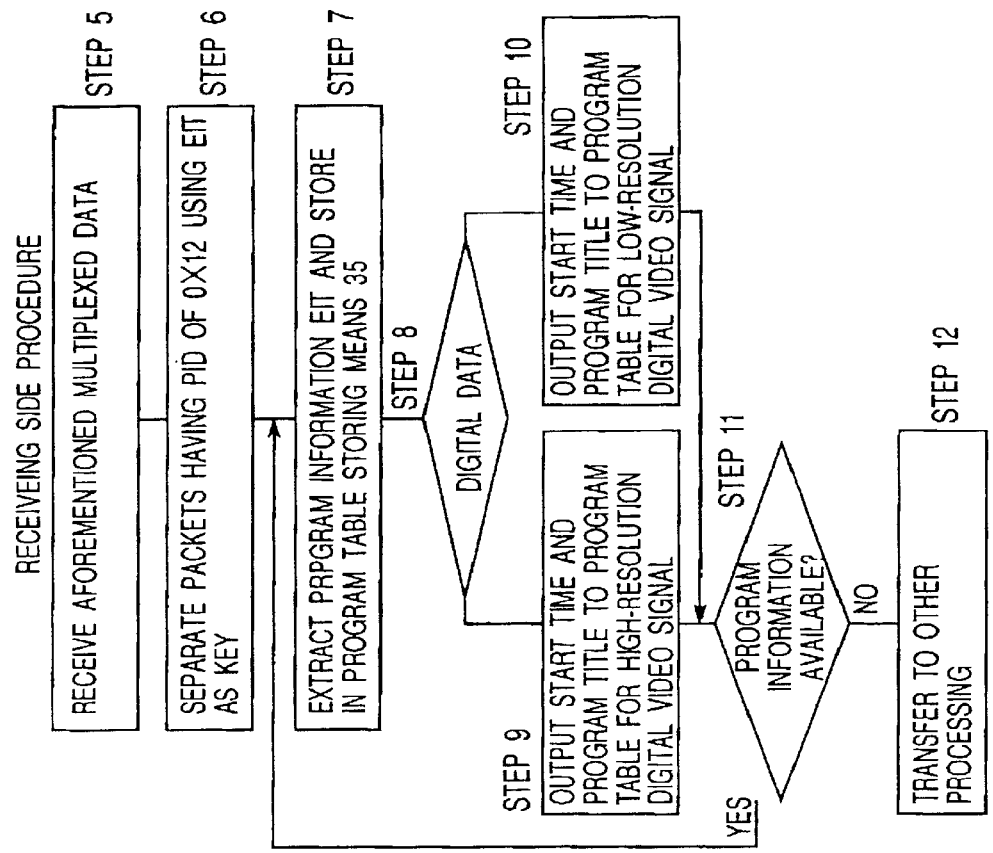
Figure 26A:
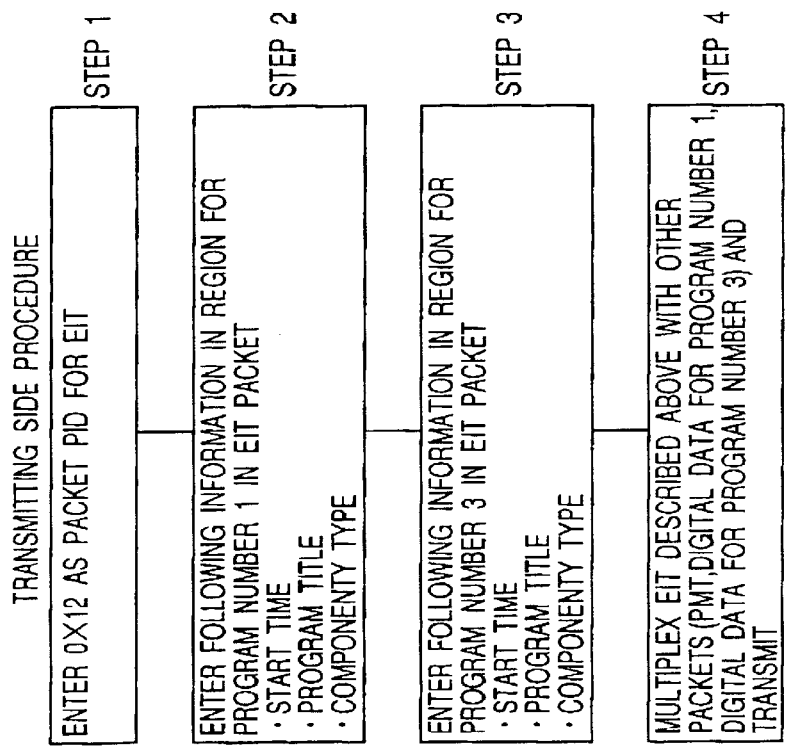

FIG. 26(A) and FIG. 26(B) are flowcharts for describing transmission and reception operations according to the present embodiment.

On the transmitting side, firstly, "0x12" is entered as a PID at the head of the EIT packet (step 1). Thereupon, the following information, which is illustrated in FIG. 13, is stored as information for program number 1, for example.

Start time: 19:00

Program name: Baseball a

Component type: 0x01 (code indicating the first digital data 4)

:0x21 (code indicating the second digital data 5)

Start time: 20:00

Program name: Quiz

Component type: 0x01 (code indicating the first digital data 4)

Start time: 21:00

Program name: Foreign film

Component type: 0x01 (code indicating the first digital data 4)

:0x21 (code indicating the second digital data 5)

Thereupon, the following information is stored as information for program number 3 (step 3).

Start time: 19:00

Program name: Baseball a

Component type: 0x01 (code indicating the first digital data 4)

Start time: 20:00

Program name: Soccer

Component type: 0x01 (code indicating the first digital data 4)

0x21 (code indicating the second digital data 5)

Start time: 21:00

Program name: Baseball b

Component type: 0x01 (code indicating the first digital data 4)

:0x21 (code indicating the second digital data 5)

Start time: 22:00

Program name: News

Component type: 0x01 (code indicating the first digital data 4)

:0x21 (code indicating the second digital data 5)

The aforementioned EIT is multiplexed and transmitted with digital data for program number 1, digital data for program number 3, and PMT packets wherein PIDs for the digital data for each program number are described (step 4).

At the receiving side, the following procedure is implemented.

The aforementioned multiplexed data transmitted by the transmitting side is demodulated by demodulating means 23 (step 5), PMT packets are separating by separating means 24 using the packet identifier PID 0x02 as a key, and EIT packets are separated and extracted using the packet identifier PID 0x12 as a key (step 6).

Thereupon, by decoding the PMT data, it is recognized that "the digital data for program number 1 has a PID of 0x91" and "the digital data for program number 3 has a PID of 0x93", and moreover, in the EIT it is possible to define a component identifier in accordance with the PID for the digital data for each program number defined in the PMT. By decoding this data, if the current time is 20:00–21:00, for example, information indicating that "the digital data for program number 1 is first digital data 4, and the digital data for program number 3 is the first digital data and second digital data 5" is obtained, and this information is stored in identification information storing means 26.

Moreover, the start times of program number 1 and program number 3 and the program names are also gathered from the EIT, along with information indicating whether the digital data is the first digital data 4 or the second digital data 5, and this information is stored in program table storing means 35 (step 7).

In program table creating means 36, if the program contains the second digital data 5, then the program name and start time are registered in the program table for high-resolution digital video signals, and if the program contains the first digital data 4, the program name and start time are registered in the program table for low-resolution digital video signals, the data is then passed to signal synthesizing means 37, and the low-resolution digital video signal and high-resolution digital video signal programs are displayed separately on image display means 31 in the form illustrated in FIG. 27(A) and FIG. 27(B) (steps 8, 9, 10).

If program information is provided supplementarily, then the aforementioned steps 8–11 are repeated (step 11), and if it is not provided, then the sequence transfers to other processing (step 12). In other words, the first digital data 4 or the second digital data 5 is decoded in accordance with controls implemented by the operator, similarly to the third embodiment described above. The output program table is taken here as a simple program table, as illustrated in FIG. 28, but it is also possible to add information indicating whether each program has a low-resolution digital video signal or a high-resolution digital video signal.

As described above, in the present sixth embodiment, in addition to transmitting the first digital data 4 and the second digital data 5, an EIT (event information table) showing the contents of the digital data for each program at different times, and identification information for identifying whether the digital data constituting each program contained in the EIT (event information table) is the first digital data 4 or the second digital data 5 is also transmitted, and at the receiving side, a program table showing the contents of the digital data for each program at different times and indicating whether the aforementioned digital data is the first digital data 4 or second digital data 5 is created on the basis of the EIT (event information table) and identification information, this table being displayed as visual information on a display screen, and therefore it can be identified readily whether the program selected by an operator involves the first digital data 4 or the second digital data 5, thereby making it possible to prevent incorrect program selection.

Moreover, similarly to the fifth embodiment, decoding programs may also be transmitted, in which case the receiver side will comprise computing means in place of decoding means and reproduce data in accordance with the decoding programs.

(Seventh Embodiment)

Figure 29:
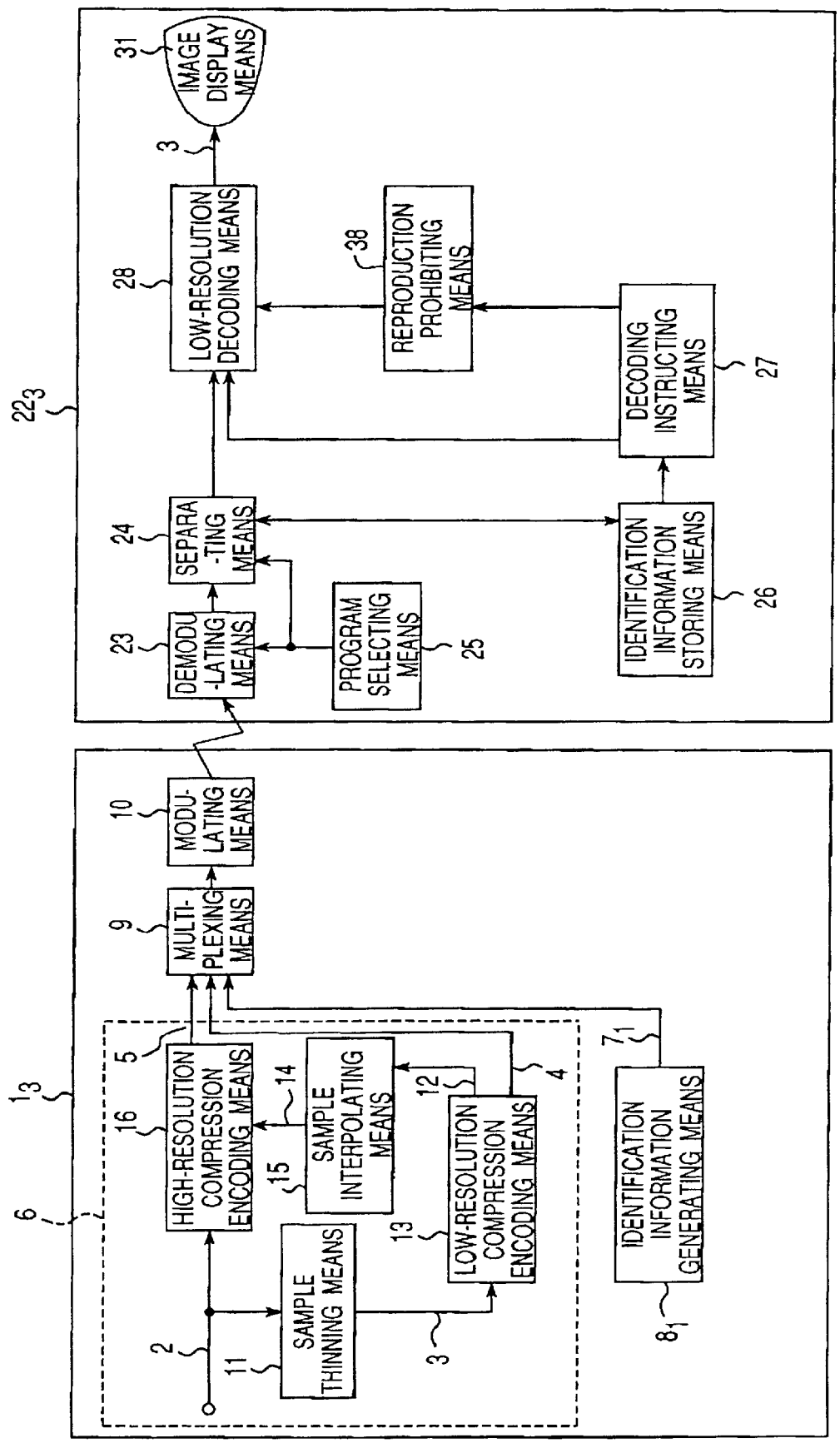
FIG. 29 is a compositional example of a system wherein a digital data transmission method according to a seventh embodiment of the present invention is applied.

FIG. 29 is a compositional diagram showing a system wherein a digital data transmission method according to embodiment 7 is applied. Parts which correspond to the second embodiment in FIG. 7 are labelled with the same reference numerals.

The transmitting side is the same as in the second embodiment, and the composition of the transmission data is also the same as the second embodiment.

In this embodiment, in order to reduce costs, the receiving side does not comprise high-resolution decoding means 30, and is provided with reproduction prohibiting means 38 for prohibiting decoding by low-resolution decoding means 28.

Decoding means 23 decodes the multiplexed data from the transmitting side. Separating means 24 separates and extracts PMT packets using the packet identifier 0x02 as a key. By decoding the PMT data, information indicating "program number 1: digital data PID=0x91, first digital data 4; program number 3: digital data PID=0x92 and 0x93, first and second digital data 4, 5, respectively" is obtained, and this information Is stored in identification information storing means 26.

A program selection is received from the operator. If the operator has selected program number 1, the PID of the digital data to be reproduced is 0x91, thereby identifying the data to be the first digital data 4. Program selecting means 25 instructs separating means 24 to separate packets having a PID of 0x91, and decoding instructing means 27 instructs low-resolution decoding means 28 to decode the first digital data 4. Thereby, a sequential scanning signal operating at 720 effective horizontal pixels×480 effective vertical scanning lines and 59.94 frames/second, for example, is displayed on image display means 31.

If the operator selects program number 3, the digital data PID will be recognized as 0x92 and 0x93 on the basis of the information from identification information storing means 26, thereby identifying the data to be the first and second digital data 4, 5, respectively. Reproduction prohibiting means 38 issues an instruction prohibiting low-resolution decoding means 28 from decoding the second digital data. Thereby, the second digital data 5 is not displayed on image display means 31, but rather only the first digital data is displayed.

As described above, in the seventh embodiment of the present invention, since information containing identification information for identifying whether data is first digital data 4 or second digital data 5 is transmitted and the receiving side comprises reproduction prohibiting means for outputting a command prohibiting reproduction to low-resolution decoding means 28, a decoding instruction is given when the digital data selected by the operator is the first digital data 4, whilst reproduction is prohibited if the digital data is the second digital data 5, and therefore the first digital data 4 can be reproduced correctly, whilst malfunction due to incorrect decoding of the second digital data 5 can be prevented.

Moreover, in the foregoing embodiment, a composition was adopted wherein only programs relating to the first digital data are displayed on the screen as a program table, similarly to the sixth embodiment of the present invention, and in this case, it is possible to prevent incorrect selection of programs which cannot be reproduced. The composition of the transmitting side is not limited to the first embodiment, but rather a composition according to any of the foregoing embodiments may be adopted.

(Eighth Embodiment)

In the first to seventh embodiments described above, a so called down-conversion system is used, whereby a low-resolution digital video signal is generated by frequency scaling of a high-resolution input digital video signal, and the low-resolution digital video signal is encoded and taken as first digital data, whilst the input digital video signal is encoded and taken as second digital data, but it is also possible to adopt a up-conversion system.

Figure 30:
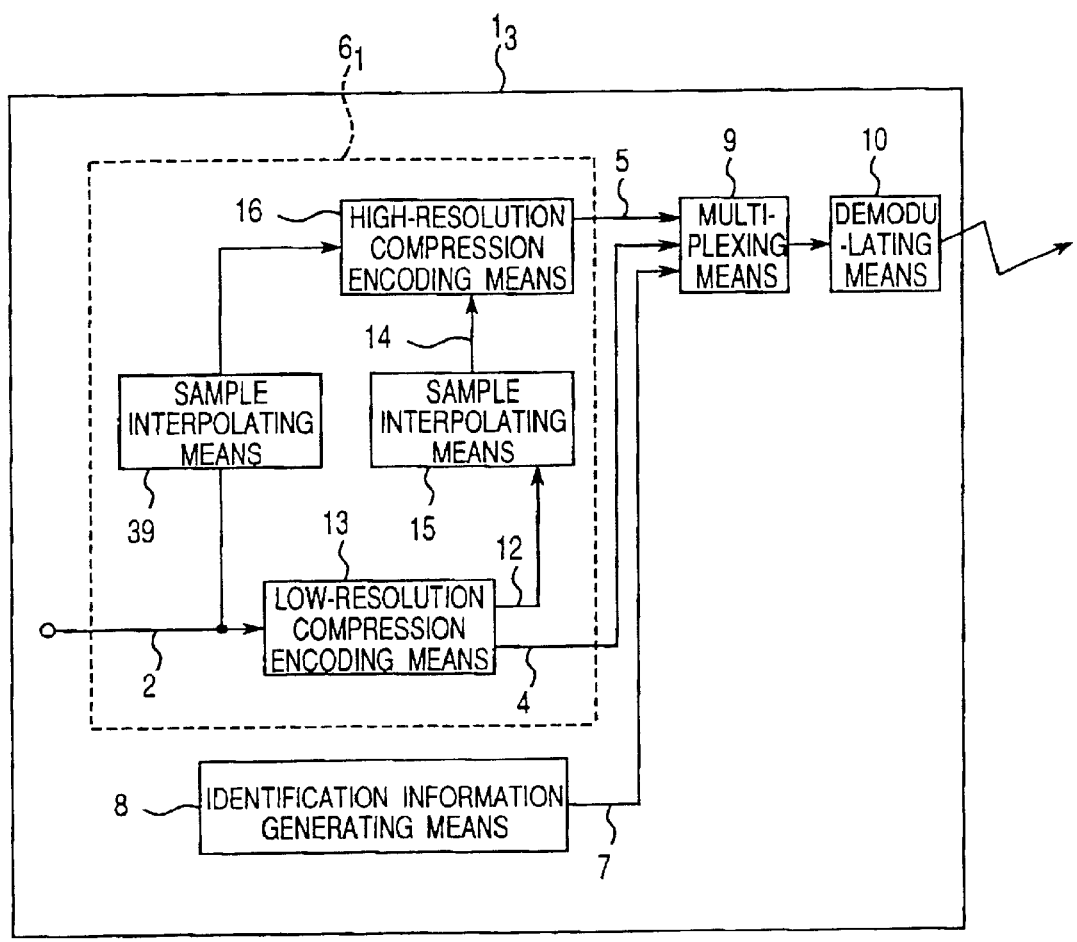
FIG. 30 is a compositional example of a digital data transmission device according to an eighth embodiment of the present invention.

Namely, FIG. 30 is a compositional diagram of a digital data transmission device 13 which generates a high-resolution digital video signal by frequency scaling of a low-resolution input digital video signal 2, and then encodes the high-resolution digital video signal to give second digital data 5 and encodes the input digital video signal 2 to give first digital data 4. Parts which correspond to the composition in FIG. 1 are labelled with the same reference numerals.

In the present embodiment, hierarchical encoding means 6, comprises: sample interpolating means 39 for generating a high-resolution digital video signal wherein the spatial resolution of an input digital video signal is enhanced by frequency scaling by interpolating pixels of an input digital video signal; high-resolution compression encoding means 16 for compressing and encoding this high-resolution digital video signal and outputting second digital data 5, and low-resolution compression encoding means 13 for compression encoding the low-resolution input digital video signal and outputting first digital data 4.

Apart from this, the composition and operation are essentially the same as the aforementioned embodiments.

According to the present embodiment, since the input digital video signal has a low resolution, the composition of the transmitting system, such as an imaging camera, or the like, becomes inexpensive, whilst the receiving side is still capable of reproducing high-resolution images.

(Ninth Embodiment)

Figure 31:
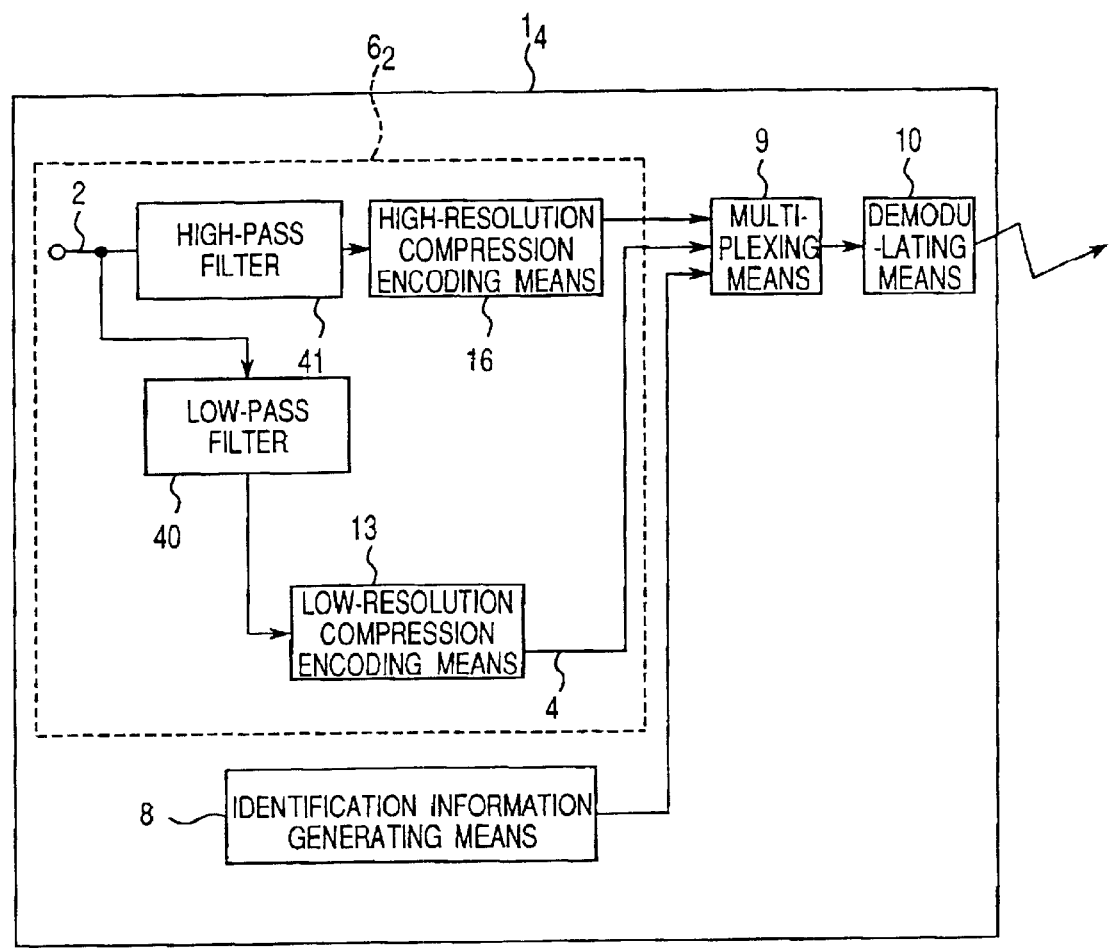
FIG. 31 is a compositional example of a digital data transmission device according to a ninth embodiment of the present invention.
Figure 33:
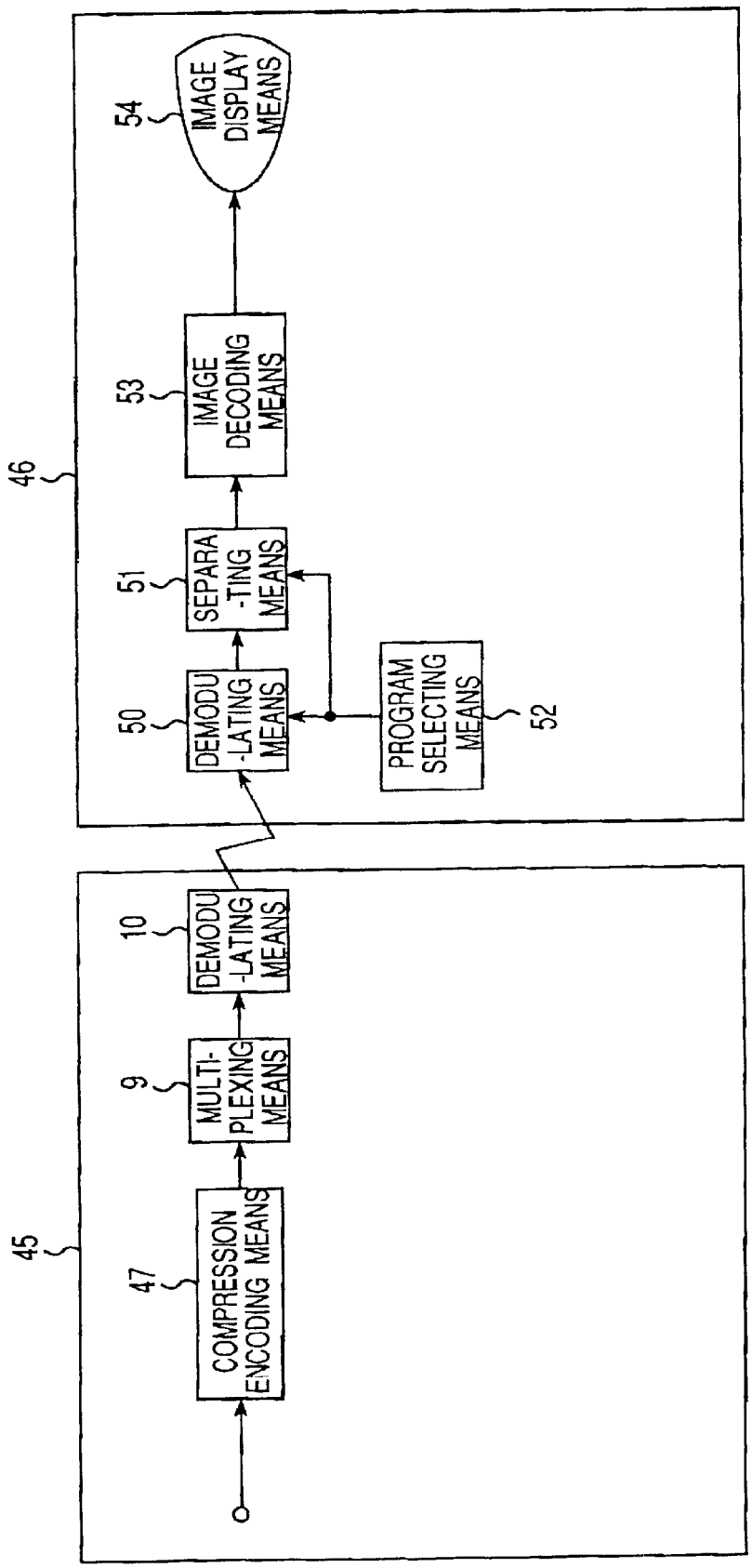
FIG. 33 is a compositional diagram of a transmission and reception system according to a prior art example.

FIG. 31 shows the composition of a digital data transmission device $1_4$ according to a ninth embodiment.

In this embodiment, a digital video signal is generated from an input digital video signal 2 by means of a low-pass filter 40, and this digital video signal is compressed and encoded by low-resolution compression encoding means 13 to form first digital data 4, whilst a further digital video signal is obtained from the input digital video signal 2 by means of a high-pass filter 41, and this digital video signal is compressed and encoded by high-resolution compression encoding means 16 to form second digital data 5.

Apart from this, the composition and operation are essentially the same as the other embodiments described above, and description thereof is omitted here.

Similarly to embodiments 1–9, the first digital data is similar to using 720 horizontal pixels×576 vertical scanning lines at 50 frames/second. This is the sequential scanning signal used in the current PAL format. According to the present invention, when digital data for a plurality of programs is divided respectively into packet units and this plurality of packets of digital data is multiplexed and transmitted with packets containing information relating to programs, in addition to transmitting, as the aforementioned digital data for a plurality of programs, first digital data obtained by encoding a sequential scanning signal operating at 720 horizontal pixels×480 vertical scanning lines and 59.94 frames/second, for example, and second digital data obtained by encoding a sequential scanning signal operating at 1280 horizontal pixels×720 vertical scanning lines and 59.94 frames/second, identification information for identifying whether the data is hierarchically encoded data or non-hierarchically encoded data, or identification information for identifying whether the data is the first digital data or the second digital data is designated and transmitted in packets containing the aforementioned information relating to programs, and therefore the receiving side can identify whether data is non-hierarchically encoded or hierarchically encoded, or alternatively, the receiving side can reproduce correctly both the first digital data and the second digital data, thereby allowing increased variety and freedom in program composition.

Moreover, since the aforementioned identification information is designated and transmitted in a program management table, each program can be transmitted individually at different resolutions, thereby allowing increased variety and freedom in program composition.

Furthermore, since the aforementioned identification information is designated and transmitted in a program contents table showing the contents of programs, it is possible to transmit the same program at different resolutions using separate channels, thereby allowing increased variety and freedom in program composition.

Moreover, since the aforementioned identification information is designated and transmitted in a network information table that shows which program is being transmitted on which channel, the resolution of transmission can be changed for each network individually, thereby allowing increased variety and freedom in program composition.

Furthermore, since decoding programs for decoding the first and second digital data are also transmitted, and the receiving side decodes the first and second digital data in accordance with these decoding programs, it is possible to modify the decoding programs readily in response to technological advances, or the like.

According to the digital data reception device of the present invention, since digital data is identified and decoded on the basis of identification information for identifying whether data is the first digital data or the second digital data, it is possible to reproduce correctly both the first digital data and the second digital data.

Moreover, since prohibiting means is provided for instructing decoding when the data is the first digital data on the basis of the aforementioned identification information and prohibiting decoding when the data is the second digital data, the first digital data can be reproduced correctly, whilst malfunctions due to reproduction of the second digital data, which cannot be decoded, are prevented.

Moreover, since a program table showing the contents of each program at different timings and indicating whether the digital data constituting these programs is the first digital data or the second digital data is created and displayed, on the basis of the aforementioned identification information and the program contents table, it can be recognized readily whether the program selected by the operator is a low-resolution digital video signal or a high-resolution digital video signal, thereby enabling incorrect program selection to be prevented.

The contents of the disclosures of Japanese Patent Application No. Hei. 8-336566, Japanese Patent Application No. Hei. 9-45599, and Japanese Patent Application No. Hei. 9-51054 are included by way of reference in the specification of the present application.

What is claimed is:

1. A method for generating a low-resolution digital video signal by frequency scaling of an input digital video signal, dividing first digital data obtained by encoding said low-resolution digital video signal and second digital data obtained by encoding said input digital video signal into packet units, respectively, and multiplexing and transmitting said data with packets containing information relating to programs, wherein, identification information for separating at least the first and the second digital data and for identifying non-hierarchical encoding and hierarchical encoding and program selection information for selecting a program are described in said packets containing information relating to programs and said first digital data having a different program content from said second digital data.

2. A method for generating a high-resolution digital video signal by frequency scaling of an input digital video signal, dividing second digital data obtained by encoding said high-resolution digital video signal and first digital data obtained by encoding said input digital video signal into packet units, respectively, and multiplexing and transmitting said data with packets containing information relating to programs, wherein, identification information for separating at least the first and the second digital data and for identifying non-hierarchical encoding and hierarchical encoding and program selection information for selecting a program are described in said packets containing information relating to programs and said first digital data has a different program content from said second digital data.

3. A method for dividing first digital data obtained by encoding a digital video signal generated from an input digital video signal with a low-pass filter and second digital data obtained by encoding a digital video signal generated from said input digital video signal with a high-pass filter in packet units, respectively, and multiplexing and transmitting said data with packets containing information relating to programs, wherein, identification information for separating at least the first and the second digital data and for identifying non-hierarchical encoding and hierarchical encoding and program selection information for selecting a program are described in said packets containing information relating to programs and said first digital data has a different program content from said second digital data.

4. A method for generating a low-resolution digital video signal by frequency scaling of an input digital video signal, dividing first digital data obtained by encoding said low-resolution digital video signal and second digital data obtained by encoding said input digital video signal into packet units, respectively, and multiplexing and transmitting said data with packets containing information relating to programs, wherein, identification information for identifying said-first digital data and said second digital data is described in said packets containing information relating to programs, said identification information is further described as a program information correspondence table showing the correspondence between program information and packet identifiers in a program contents table.

5. A method for generating a high-resolution digital video signal by frequency scaling of an input digital video signal, dividing second digital data obtained by encoding said high-resolution digital video signal, and first digital data obtained by encoding said input digital video signal into packet units, respectively, and multiplexing and transmitting said data with packets containing information relating to programs, wherein, identification information for identifying said first digital data and said second digital data is described in said packets containing information relating to programs, said identification information is further described as a program information correspondence table showing the correspondence between program information and packet identifiers in a program contents table.

6. A method for dividing first digital data obtained by encoding a digital video signal generated from an input digital video signal by means of a low-pass filter and second digital data obtained by encoding a digital video signal generated from said input digital video signal by means of a high-pass filter in packet units, respectively, and multiplexing and transmitting said data with packets containing information relating to programs, wherein, identification information for identifying said first digital data and said second digital data is described in said packets containing information relating to programs, said identification information is further described as a program information correspondence table showing the correspondence between program information and packet identifiers in a program contents table.

7. The digital data transmission method according to claim 4, wherein, decoding programs for decoding at least one of said first digital data and said second digital data are divided into packet units and multiplexed with said packets containing information relating to programs.

8. The digital data transmission method according to claim 1, wherein, said packets containing information relating to programs form a program management table showing which program is transmitted by which packet.

9. The digital data transmission method according to claim 1, wherein, said packets containing information relating to programs form a program contents table showing the contents of programs.

10. The digital data transmission method according to claim 1, wherein, said packets containing information relating to programs form a network information table showing which programs are broadcast by which channel.

11. A digital data transmission device comprising: hierarchical encoding system that generates a low-resolution digital video signal by frequency scaling of an input digital video signal and outputting first digital data obtained by encoding said low-resolution digital video signal, as well as outputting second digital data obtained by encoding said input digital video signal, an identification information generating system that generates identification information for separating at least the first and the second digital data and for identifying non-hierarchical encoding and hierarchical encoding;

a program selecting system that generates program selection information for selecting a program; and a multiplexing system that divides said first digital data and said second digital data into packet units and multiplexes said data with packets containing information relating to programs, wherein, said identification information and said program selection information are described in said packets containing information relating to programs and said first digital data has a different program content from said second digital data.

12. A digital data transmission device comprising:

a hierarchical encoding system that generates a high-resolution digital video signal by frequency scaling of an input digital video signal and outputting second digital data obtained by encoding said high-resolution digital video signal, as well as outputting first digital data obtained by encoding said input digital video signal, an identification information generating'system that generates identification information for separating at least the first and the second digital data and for identifying non-hierarchical encoding and hierarchical encoding;

a program selecting system that generates program selection information for selecting a program; and a multiplexing system that divides said first digital data and said second digital data into packet units and multiplexes said data with packets containing information relating to programs, wherein, said identification information and said program selection information are described in said packets containing information relating to programs and said first digital data has a different program content from said second digital data.

13. A digital data transmission device comprising:
a hierarchical encoding system that outputs first digital data obtained by encoding a digital video signal generated from an input digital video signal with a low-pass filter and second digital data obtained by encoding a digital data generated from said input digital video signal with a high-pass filter;
an identification information generating system that generates identification information for separating at least the first and the second digital data and for identifying non-hierarchical encoding and hierarchical encoding;
a program selecting system that generates program selection information for selecting a program; and
a multiplexing system that divides said first digital data and said second digital data into packet units and multiplexes said data with packets containing information relating to programs,
wherein, said identification information and said program selection information are described in said packets containing information relating to programs and said first digital data has a different program content from said second digital data.

14. A digital data transmission device comprising:
a hierarchical encoding system that generates a low-resolution digital video signal by frequency scaling of an input digital video signal and outputting first digital data obtained by encoding said low-resolution digital video signal, as well as outputting second digital data obtained by encoding said input digital video signal;
an identification information generating system that generates identification information for separating at least the first and the second digital data and for identifying said first digital data and said second digital data, wherein, charge information relating to said first digital data and said second digital data is transmitted supplementarily; and
a multiplexing system that divides said first digital data and said second digital data into packet units and multiplexes said data with packets containing information relating to programs,
wherein, said identification information is described in said packets containing information relating to programs.

15. A digital data transmission device comprising:
a hierarchical encoding system that generates a high-resolution digital video signal by frequency scaling of an input digital video signal and outputting second digital data obtained by encoding said high-resolution digital video signal, as well as outputting first digital data obtained by encoding said input digital video signal;
an identification information generating system that generates identification information for separating at least the first and the second digital data and for identifying said first digital data and said second digital data; and
a multiplexing system that divides said first digital data and said second digital data into packet units and multiplexes said data with packets containing information relating to programs,
wherein, said identification information is described in said packets containing information relating to programs, said identification information is further described as a program information correspondence table showing the correspondence between program information and packet identifiers in a program contents table.

16. A digital data transmission device comprising:
a hierarchical encoding system that outputs first digital data obtained by encoding a digital video signal generated from an input digital video signal by means of a low-pass filter and second digital data obtained by encoding a digital data generated from said input digital video signal by means of a high-pass filter;
an identification information generating system that generates identification information for separating at least the first and the second digital data and for identifying said first digital data and said second digital data; and
a multiplexing system that divides said first digital data and said second digital data into packet units and multiplexes said data with packets containing information relating to programs,
wherein, said identification information is described in said packets containing information relating to programs, said identification information is further described as a program information correspondence table showing the correspondence between program information and packet identifiers in a program contents table.

17. The digital data transmission device according to claim 14, comprising a decoding program generating system that generates decoding programs for decoding at least one of said first digital data and said second digital data, said decoding programs being divided into packet units and multiplexed with said packets containing information relating to programs.

18. The digital data transmission device according to claim 11, wherein, said packets containing information relating to programs form a program management table showing which program is transmitted by which packet.

19. The digital data transmission device according to claim 11, wherein, said packets containing information relating to programs form a program contents table showing the contents of programs.

20. The digital data transmission device according to claim 11, wherein, said packets containing information relating to programs form a network information table showing which programs are broadcast by which channel.

21. The digital data transmission device according to claim 18, wherein, said identification information is described in a system control identifier of a program information descriptor in said program management table.

22. The digital data transmission device according to claim 18, wherein, said identification information is described in a stream identifier of a program information descriptor in said program management table.

23. The digital data transmission device according to 19, wherein, said identification information is described in a component identifier indicating image data attributes in said program contents table.

24. The digital data transmission device according to claim 19, wherein, said identification information is described as a program information correspondence table showing the correspondence between program information and packet identifiers in said program contents table.

25. The digital data transmission device according to claim 20, wherein said identification information is described in a network identifier for identifying the network transmitting the image data in said network information table.

26. The digital data transmission device according to claim 11, wherein, said first digital data is a signal obtained by compression encoding of a sequential scanning signal operating at 720 maximum effective horizontal pixels, 480 maximum effective vertical scanning lines, and a maximum frame rate of 60 frames/second.

27. A digital data reception device for receiving a signal transmitted by multiplexing first digital data and second digital data, obtained by encoding a low-resolution digital video signal and a high-resolution digital video signal, with identification information for identifying both of said digital data, and reproducing said low-resolution digital video signal and said high-resolution digital video signal, comprising:

a demodulating system that demodulates said first digital data, said second digital data and information containing said identification information, a separating system that separates and extracts digital data corresponding to a program selection operation on the basis of said identification information and said program selection operation, a low-resolution decoding system that decodes first digital data separated and extracted by said separating system and outputs said data as a low-resolution digital video signal; and a high-resolution decoding system that decodes second digital data separated and extracted by said separating system and outputs said data as a high-resolution digital video signal.

28. A digital data reception device for receiving a signal transmitted by multiplexing first digital data and second digital data, obtained by encoding a low-resolution digital video signal and a high-resolution digital video signal, with identification information for identifying both said digital data and a first and a second decoding program for decoding both said digital data, respectively, and reproducing said low-resolution digital video signal and said high-resolution digital video signal, comprising:

a demodulating system that demodulates said first and second digital data, and information containing said identification information and said first and second decoding programs, a separating system that separates and extracts digital data and a decoding program corresponding to a program selection operation, on the basis of said identification information and said program selection operation, a low-resolution computing system that decodes first digital data separated and extracted by said separating system in accordance with the first decoding program and outputs said data as a low-resolution digital video signal; and a high-resolution computing system that decodes second digital data separated and extracted by said separating system in accordance with the second decoding program and outputs said data as a high-resolution digital video signal.

29. A digital data reception device for receiving a signal transmitted by multiplexing first digital data and second digital data, obtained by encoding a low-resolution digital video signal and a high-resolution digital video signal, with identification information for identifying both said digital data, and reproducing said low-resolution digital video signal; comprising:

a demodulating system tat demodulates said first digital data, said second digital data and information containing said identification information, a separating system that separates and extracts digital data corresponding to a program selection operation on the basis of said identification information and said program selection operation, a low-resolution decoding system that decodes first digital data separated and extracted by said separating system and outputs said data as a low-resolution digital video signal; and a prohibiting system that prohibits decoding of second digital data separated and extracted by said separating system.

30. A digital data reception device for receiving a signal transmitted by multiplexing first digital data and second digital data, obtained by encoding a low-resolution digital video signal and a high-resolution digital video signal, with identification information for identifying both said digital data and a program contents table showing the contents of programs at different times and the contents of the digital data constituting each program, reproducing a selected program, and charge information relating to said first digital data and said second digital data is transmitted supplementarily comprising:

a program table creating system that creates a program table showing the contents of programs at different times and indicating whether the digital data constituting each program is the first digital data or second digital data, on the basis of said program contents table and said identification information, said program table created being displayed on an image display system.

31. The digital data reception device according to claim 30, wherein, the programs relating to said first digital data or the programs relating to said second digital data are displayed as a program table.

32. The digital data reception device according to claim 27, wherein, said first digital data is a signal obtained by compression encoding of a sequential scanning signal operating at 720 maximum effective horizontal pixels×480 effective vertical scanning lines and a maximum frame rate of 60 frames/second.

* * * * *